United States Patent
Ke et al.

(10) Patent No.: US 11,140,601 B2
(45) Date of Patent: Oct. 5, 2021

(54) REDUCING DELAY OF A UE ACCESS TO A NETWORK

(71) Applicant: Samsung Electronics Co., Ltd., Suwon-si (KR)

(72) Inventors: Xiaowan Ke, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/312,604

(22) PCT Filed: Jun. 23, 2017

(86) PCT No.: PCT/KR2017/006669
§ 371 (c)(1),
(2) Date: Dec. 21, 2018

(87) PCT Pub. No.: WO2017/222344
PCT Pub. Date: Dec. 28, 2017

(65) Prior Publication Data
US 2019/0357106 A1     Nov. 21, 2019

(30) Foreign Application Priority Data

| Jun. 23, 2016 | (CN) | 201610464085.8 |
| Sep. 30, 2016 | (CN) | 201610875932.X |
| May 2, 2017 | (CN) | 201710302321.0 |

(51) Int. Cl.
H04W 36/22    (2009.01)
H04W 36/12    (2009.01)
(Continued)

(52) U.S. Cl.
CPC .......... *H04W 36/22* (2013.01); *H04W 36/12* (2013.01); *H04W 48/08* (2013.01); *H04W 68/00* (2013.01)

(58) Field of Classification Search
CPC ..... H04W 36/22; H04W 36/12; H04W 36/02; H04W 36/14; H04W 36/38; H04W 36/00;
(Continued)

(56) References Cited

U.S. PATENT DOCUMENTS

2014/0066075 A1*  3/2014  Chun .................. H04W 36/385
455/438
2014/0254476 A1   9/2014  Blankenship et al.
(Continued)

OTHER PUBLICATIONS

ISA/KR, "International Search Report and Written Opinion of the International Searching Authority," International Application No. PCT/KR2017/006669, dated Oct. 24, 2017, 11 pages.
(Continued)

*Primary Examiner* — Ian N Moore
*Assistant Examiner* — Brian T Le

(57) ABSTRACT

A data transmission supporting method and apparatus, which includes obtaining, by a first node, access information of a UE; transmitting, by the first node, data information associated with the UE or data of the UE buffered in the first node to a second radio access network node accessed by the UE according to the access information. According to the present disclosure, service continuity requirements in the further mobile communication network can be effectively adapted.

8 Claims, 13 Drawing Sheets

(51) Int. Cl.
*H04W 68/00* (2009.01)
*H04W 48/08* (2009.01)

(58) Field of Classification Search
CPC ..... H04W 48/08; H04W 68/00; H04W 28/02;
H04W 72/04; H04W 16/08; H04W 28/08;
H04W 40/24; H04W 4/12; H04W 36/023;
H04W 36/125; H04W 36/16; H04W
36/165; H04W 36/18; H04W 36/20;
H04W 36/28; H04W 36/30; H04W
36/385

See application file for complete search history.

(56) References Cited

U.S. PATENT DOCUMENTS

| | | |
|---|---|---|
| 2015/0172964 A1 | 6/2015 | Huang et al. |
| 2015/0223117 A1 | 8/2015 | Jha |
| 2015/0257146 A1 | 9/2015 | Xu et al. |
| 2015/0358870 A1 | 12/2015 | Wu |

OTHER PUBLICATIONS

The First Office Action in connection with Chinese Application No. 201710302321.0 dated Feb. 3, 2020, 17 pages.
Nokia et al., "Paging for light connection," R2-163888, 3GPP TSG-RAN WG2 Meeting #94, Nanjing, China, May 23-27, 2016, 6 pages.
Samsung, "Design principles and considerations for the LTE light connection," R2-163450, 3GPP TSG-RAN WG2 Meeting #94, Nanjing, China, May 23-27, 2016, 4 pages.

\* cited by examiner

[Fig. 1]
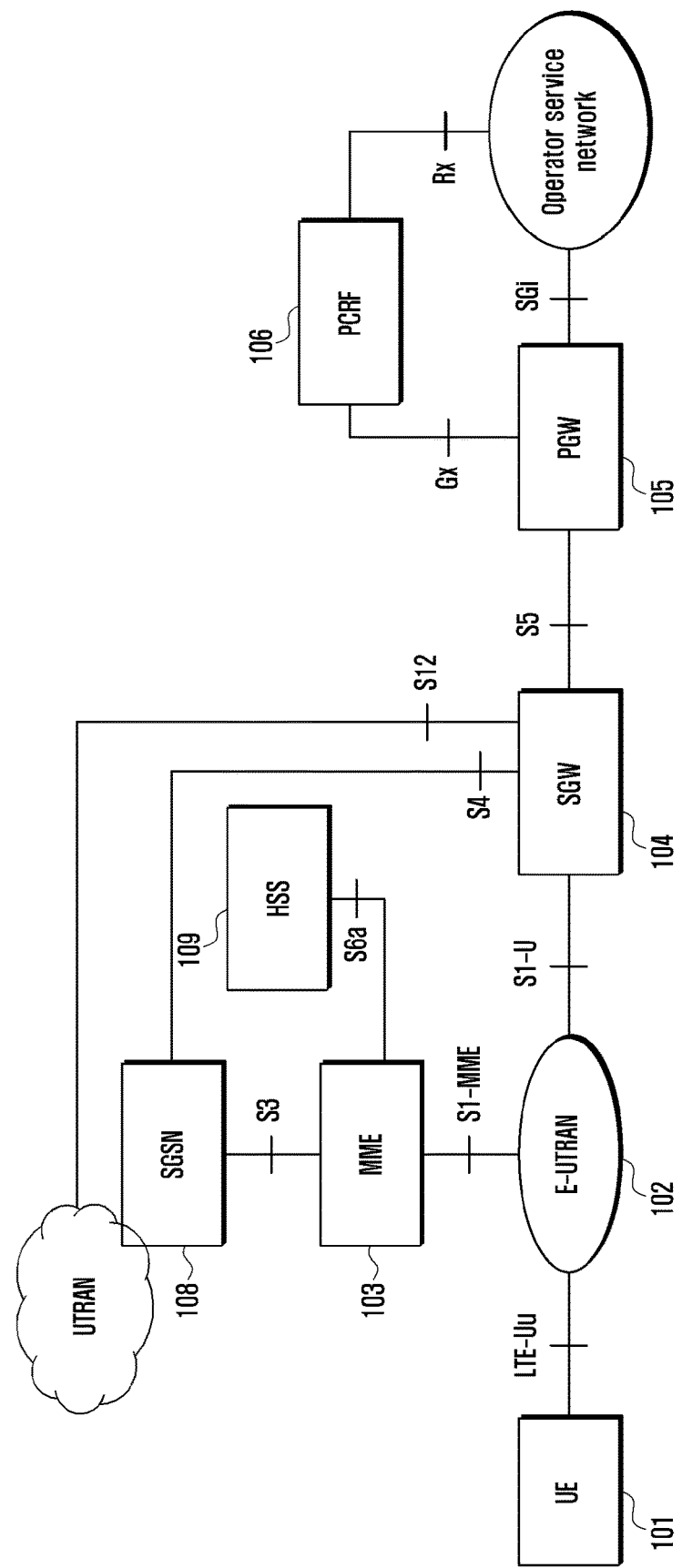

[Fig. 2]
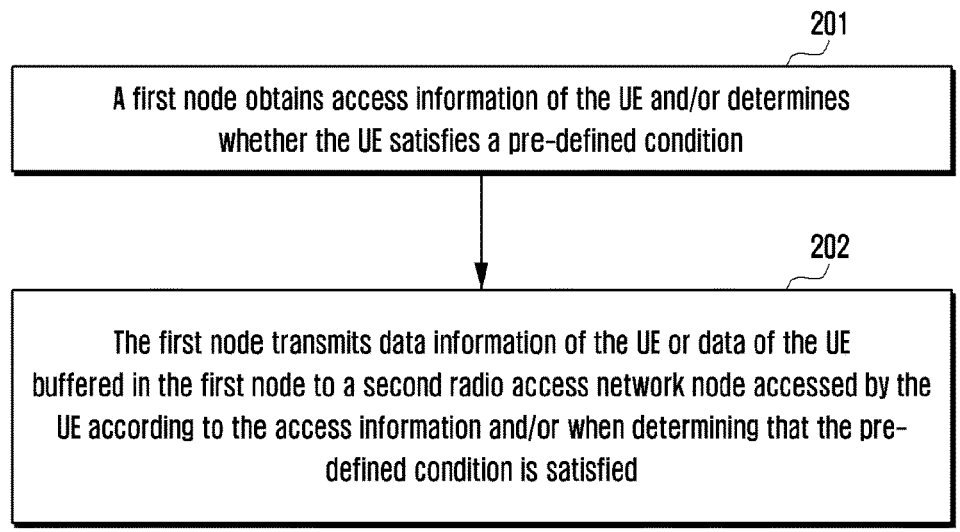
[Fig. 3]
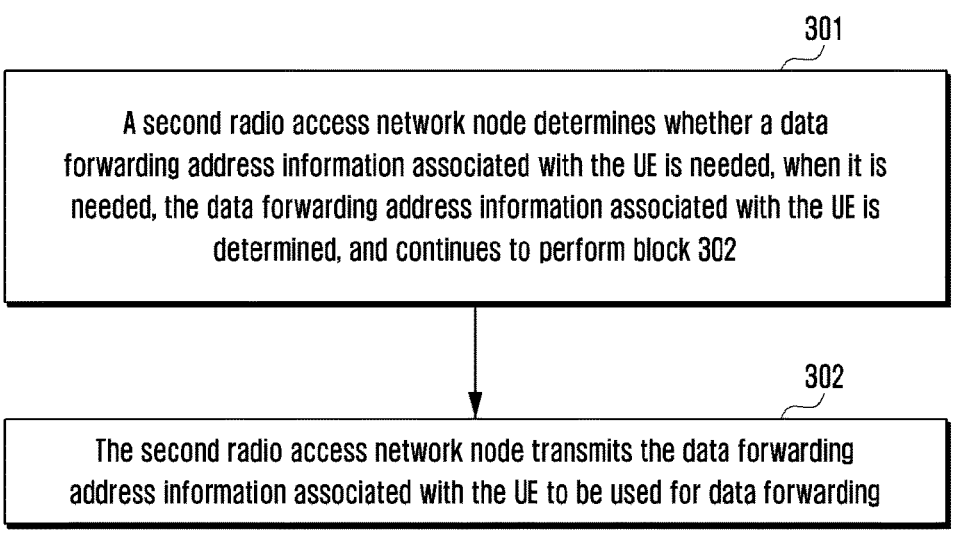
[Fig. 4]
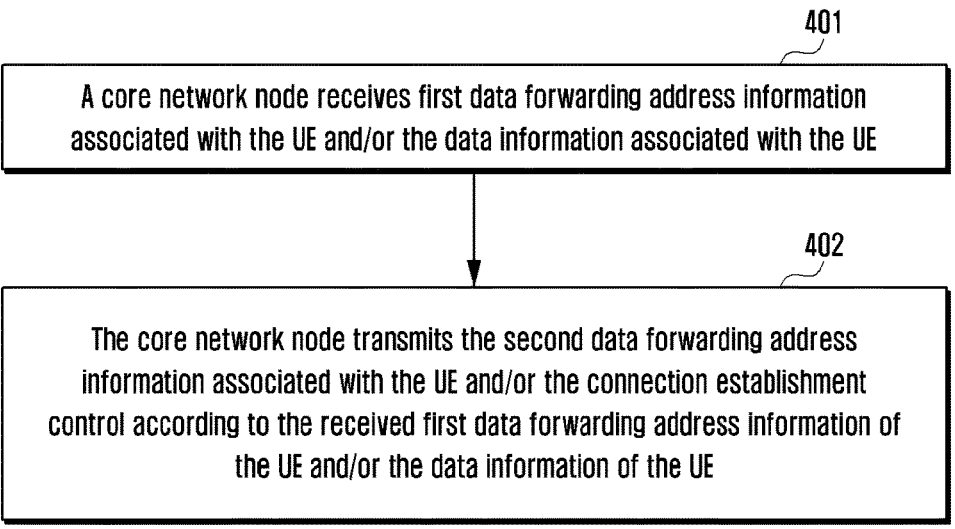

[Fig. 5]
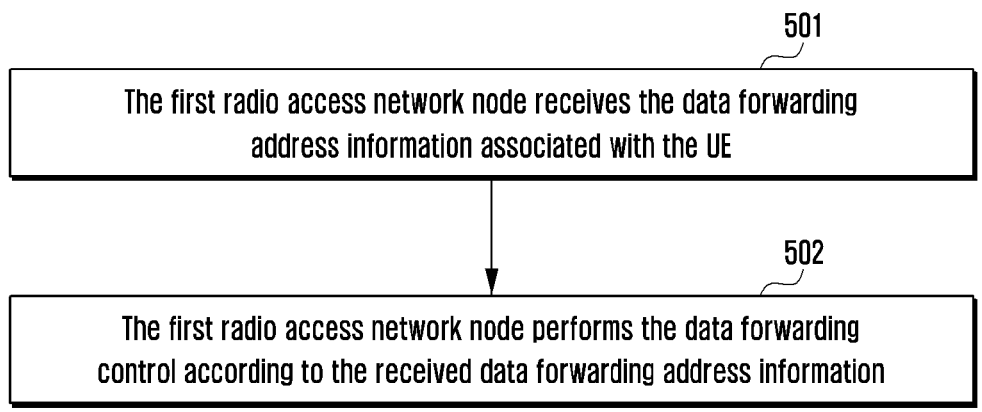

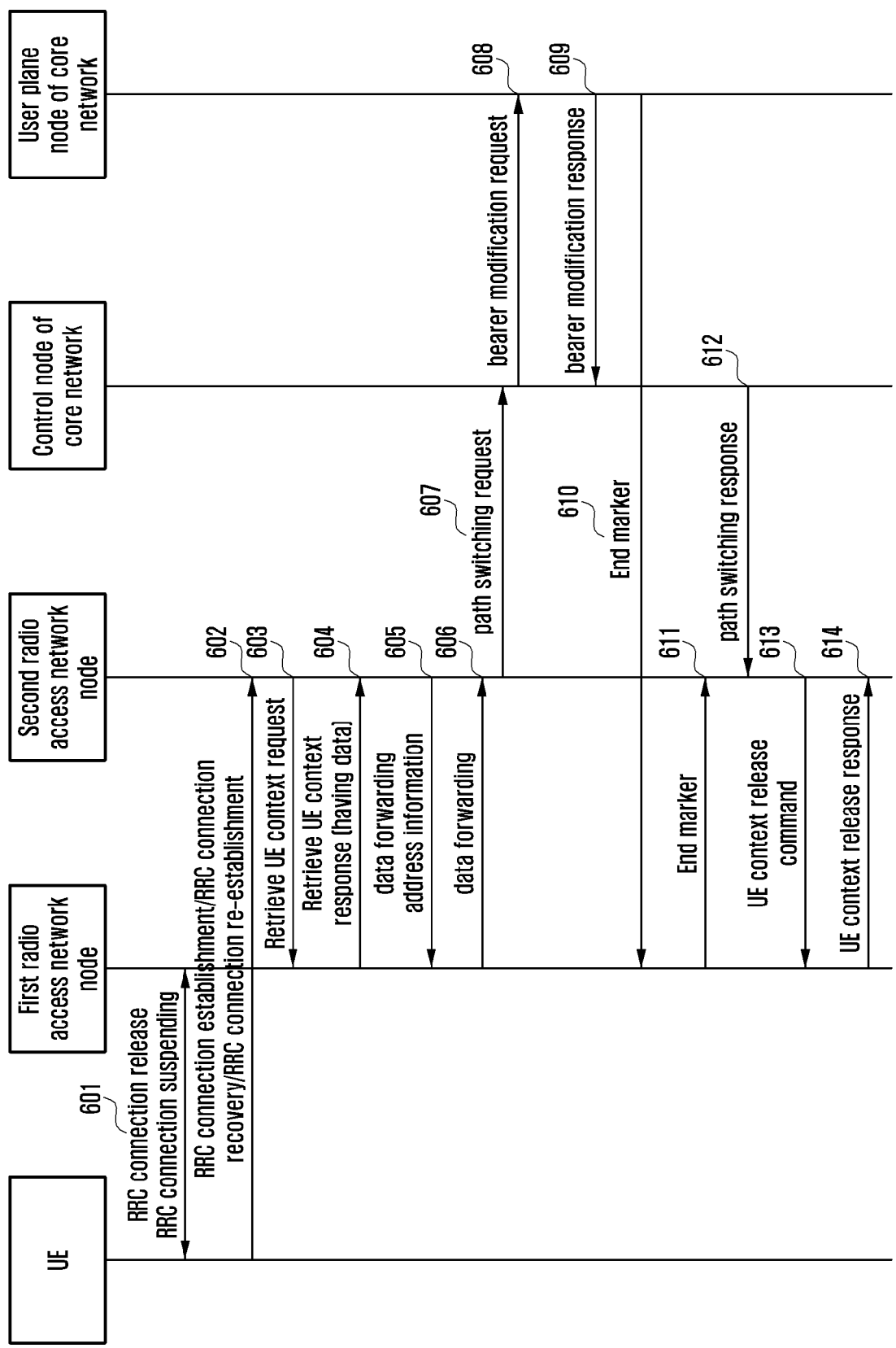
[Fig. 6]

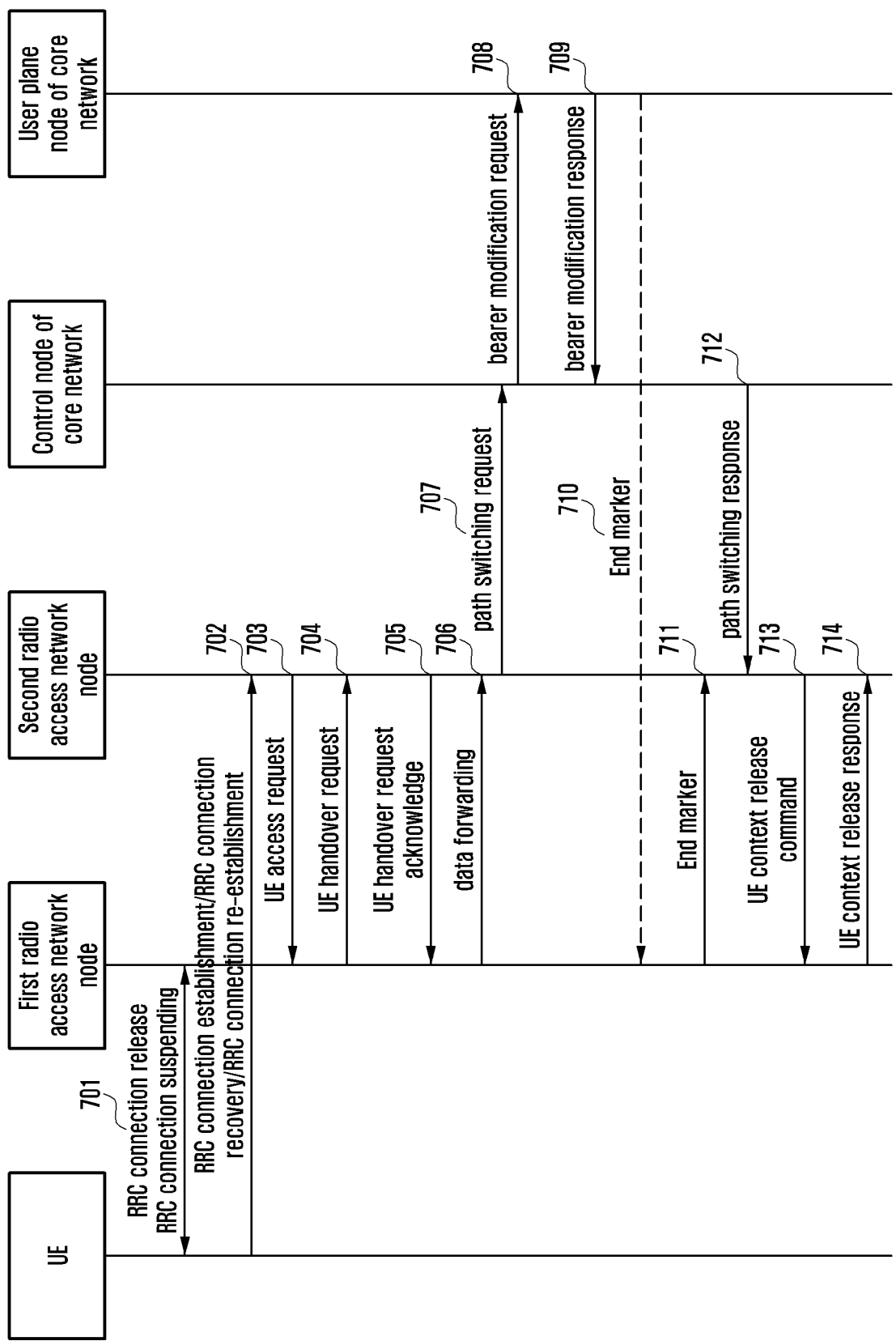

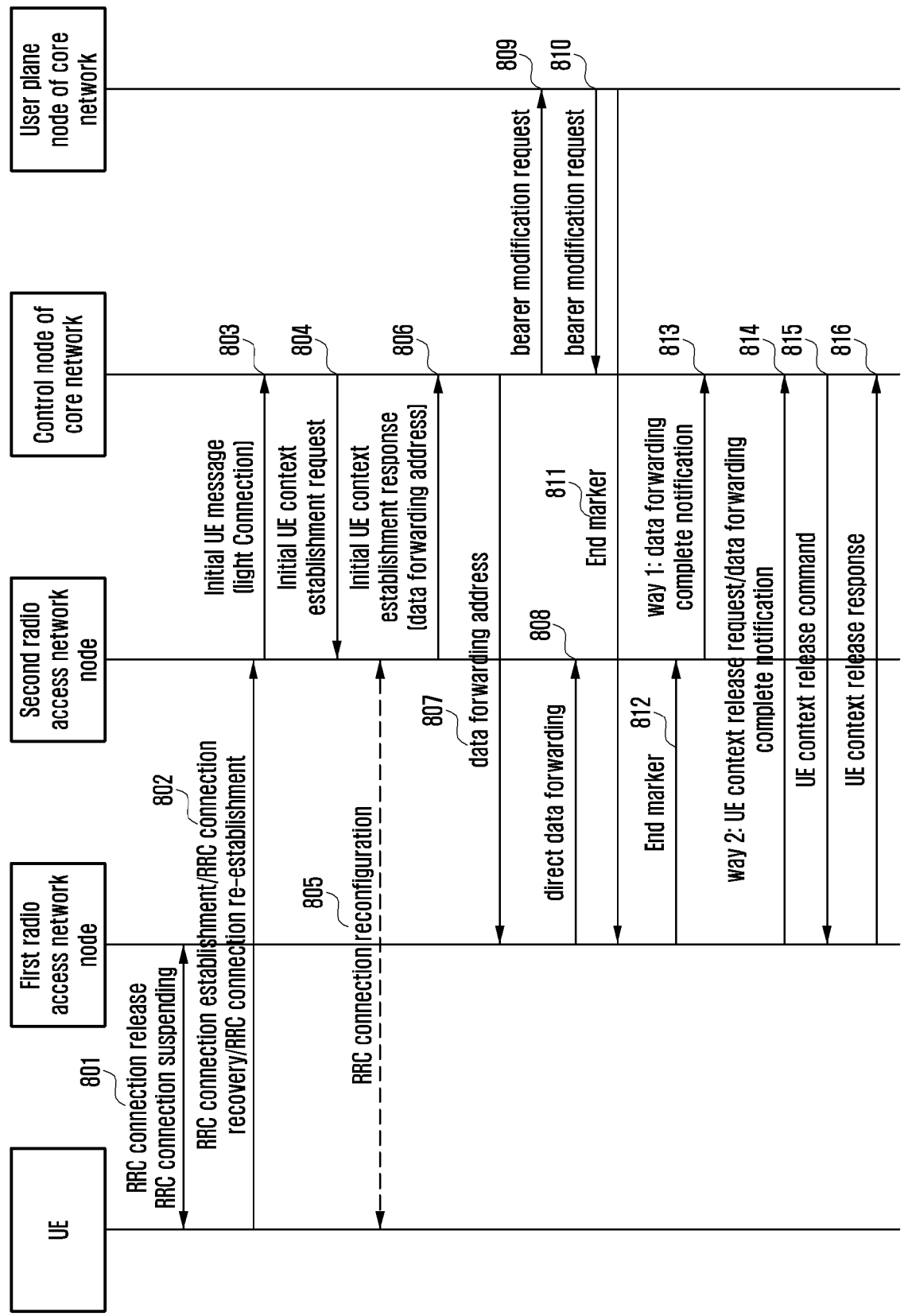
[Fig. 8]

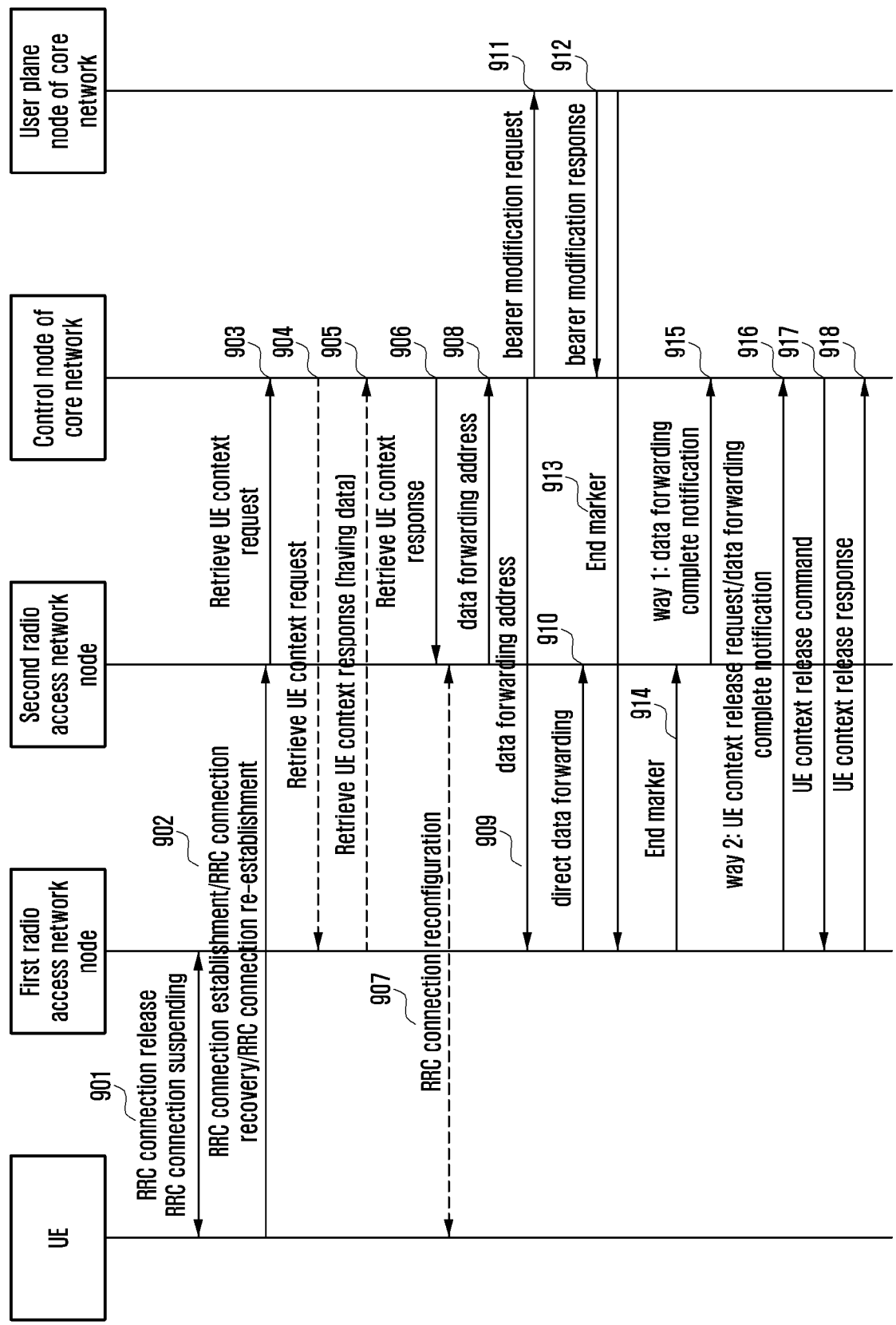
[Fig. 9]

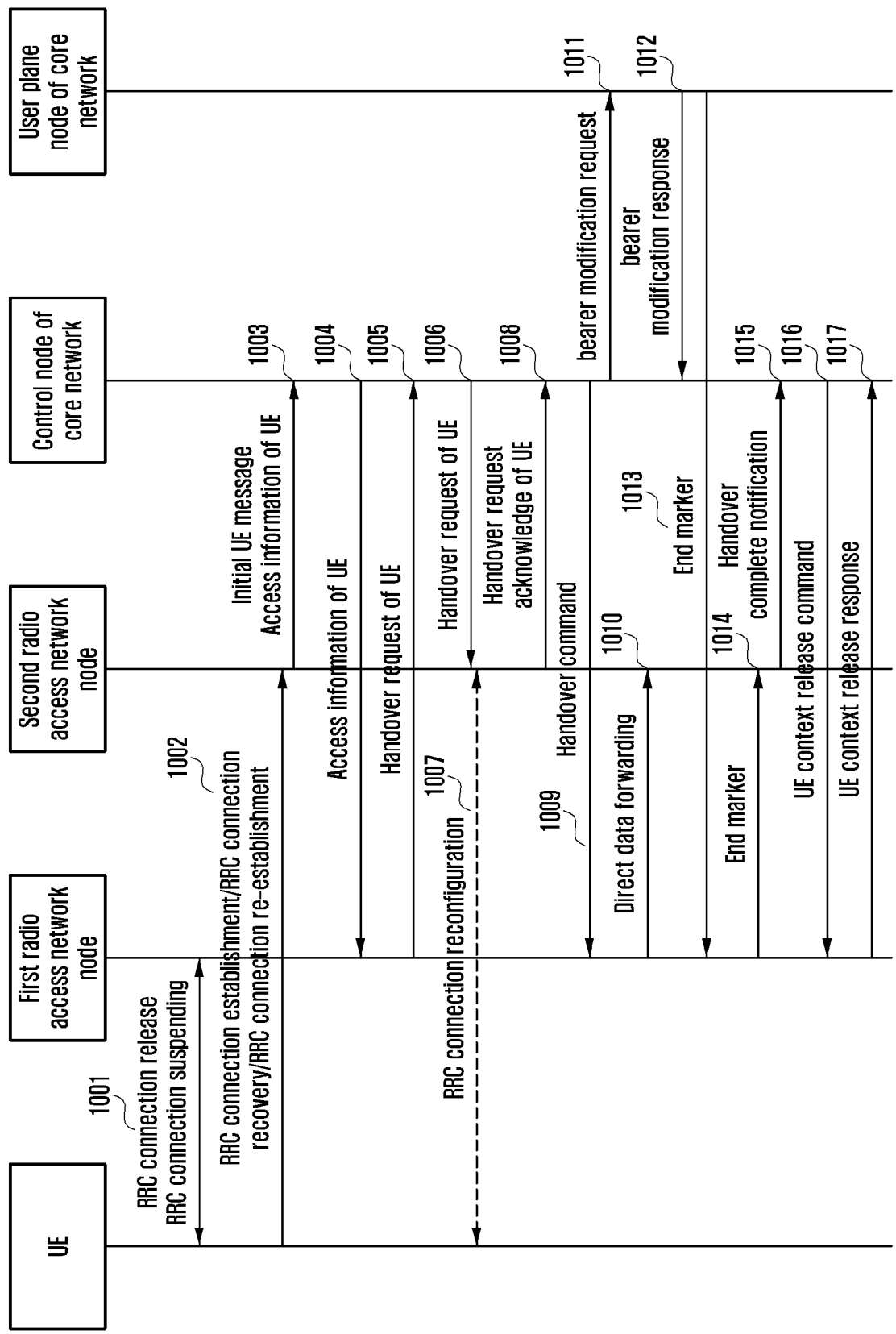
[Fig. 10]

[Fig. 11]
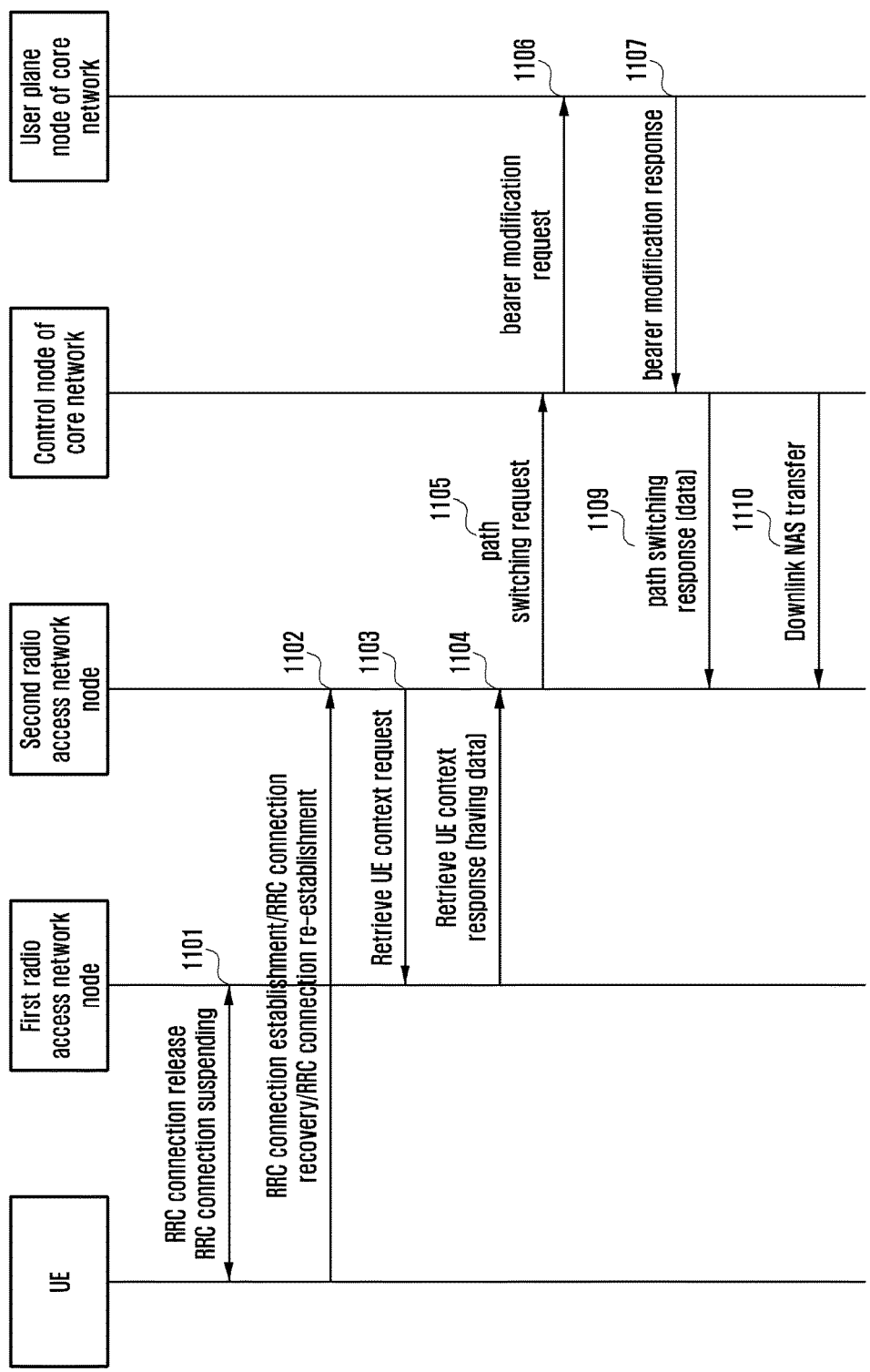
[Fig. 12]
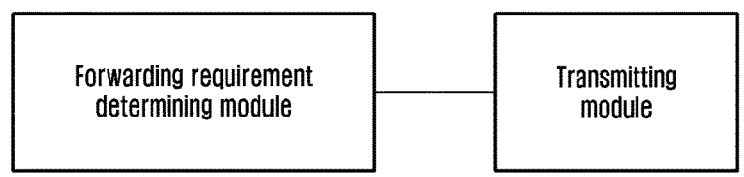

[Fig. 13]
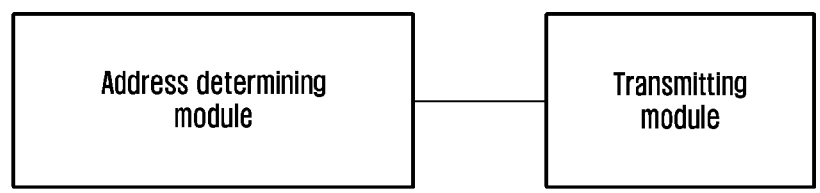
[Fig. 14]
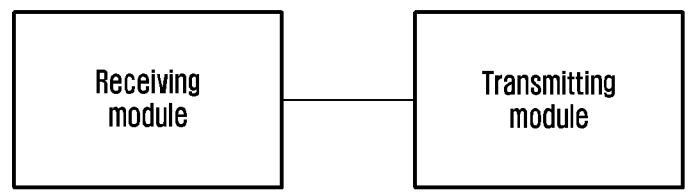
[Fig. 15]
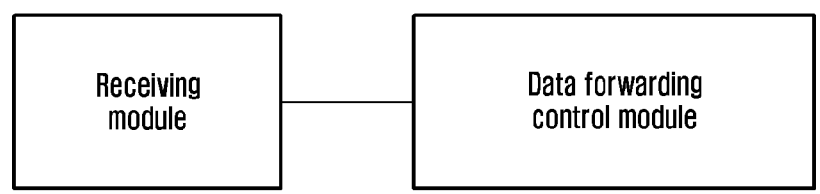

[Fig. 16]
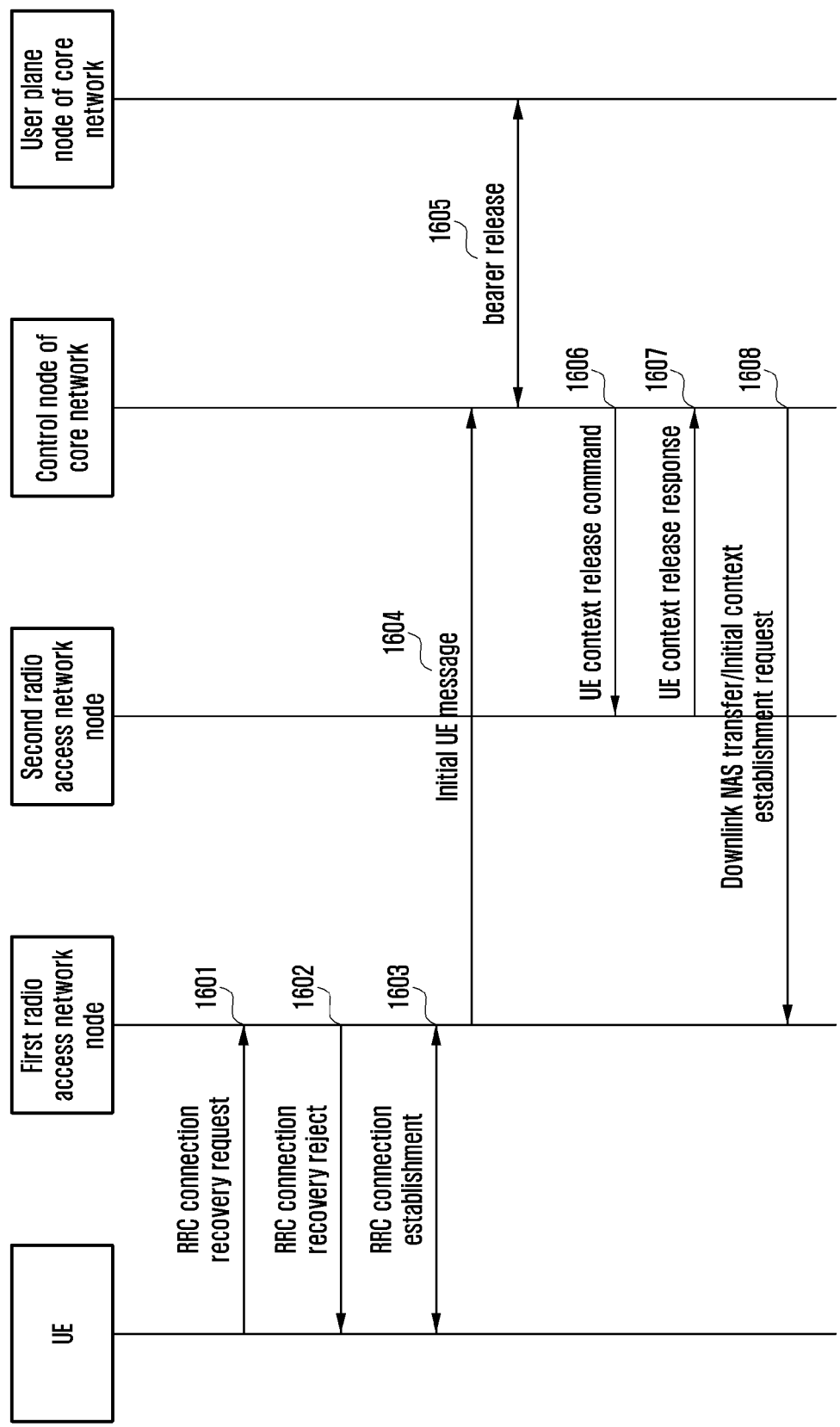

[Fig. 17]
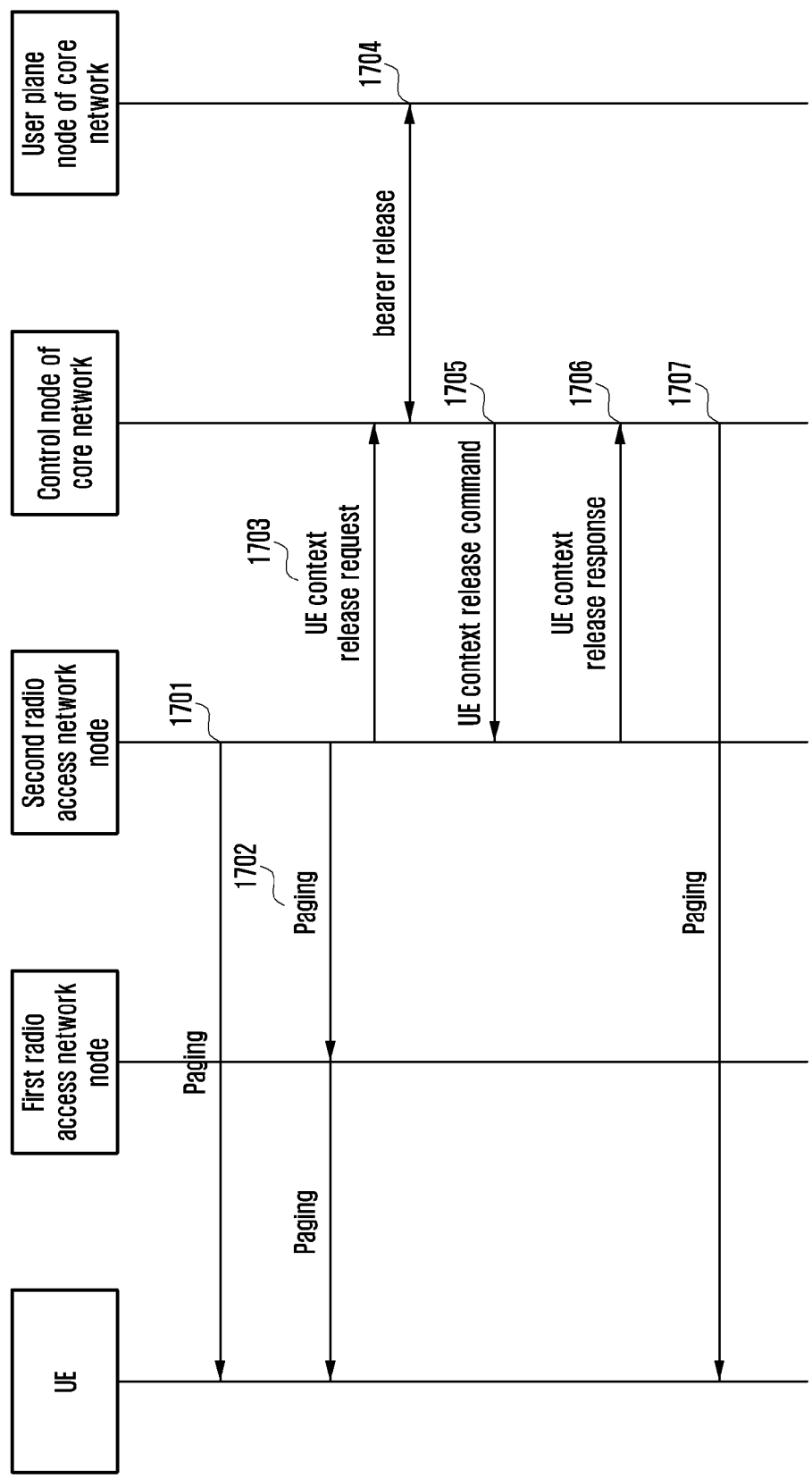

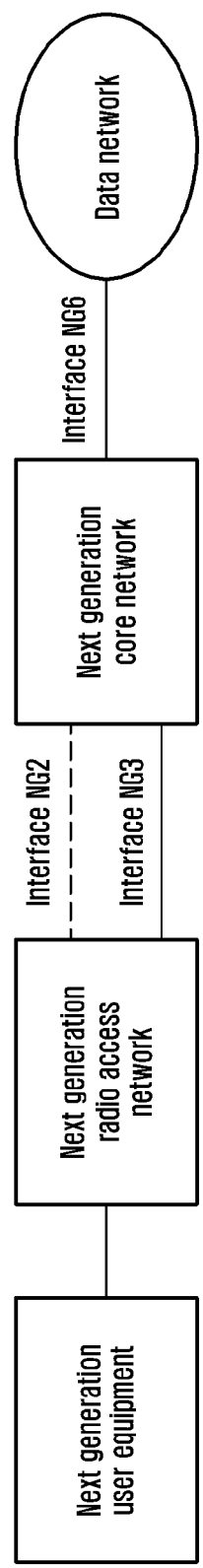
[Fig. 18]

REDUCING DELAY OF A UE ACCESS TO A NETWORK

CROSS-REFERENCE TO RELATED APPLICATIONS

This application is a 371 National Stage of International Application No. PCT/KR2017/006669, filed Jun. 23, 2017, which claims priority to Chinese Patent Application No. 201610464085.8 filed on Jun. 23, 2016, Chinese Patent Application No. 201610875932.X filed on Sep. 30, 2016, and Chinese Patent Application No. 201710302321.0 filed on May 2, 2017, the disclosures of which are herein incorporated by reference in their entirety.

BACKGROUND

1. Field

The present invention relates to radio communication technologies, and more particularly, to a data transmission supporting method and apparatus.

2. Description of Related Art

Modern mobile communication increasingly tends to provide multimedia services of high-speed transmission for users. FIG. 1 is a schematic diagram illustrating system architecture of system architecture evolution (SAE).

A user equipment (UE) 101 is a terminal device supporting network specifications. An Evolved Universal Terrestrial Radio Access Network (E-UTRAN) 102 is a radio access network, which includes a base station (eNodeB/NodeB) providing a radio network interface for the UE. A mobility management entity (MME) 103 is responsible for management of UE mobility context, session context and security information. A Service Gateway (SGW) 104 mainly supports user plane functions, MME 103 and SGW 104 may be located within a same physical entity. A Public Data Network Gateway (PGW) 105 is responsible for functions, e.g., charging, lawful interception, and may be located in a same physical entity with SGW 104. A Policy and Charging Rules Function (PCRF) 106 provides Quality of Service (QoS) policies and charging rules. A Serving GPRS Support Node (SGSN) 108 is a network node device providing routing for date transmission in Universal Mobile Telecommunications System (UMTS). A Home Subscriber Server (HSS) 109 is a home subscriber subsystem of the UE, and is responsible for protecting user information, e.g., a current location of the UE, an address of a server node, user security information, a public data context of the UE.

FIG. 18 is a schematic diagram of initial system architecture of the next generation of network (5G). The initial system architecture comprises a NextGen UE, a Next Gen access network or Next Gen radio access network (Next Gen (R)AN), a NextGen Core and a data network. A control plane interface between the Next Gen (R)AN and the NextGen Core is NG2 (also presented as NG-C), and a user plane interface is NG3 (also presented as NG-U). These interfaces are named temporarily, and the use of other names eventually decided by the 3GPP will not influence the main contents of the present invention. The NextGen Core further comprises a user plane functional entity and a control plane functional entity.

In predictable future, more and more intelligent electrical devices and living around products inter-connected among each other have network access functions. On one side, a part of UEs in future usually have characteristics as follows: static or low mobility, low cost, discontinuous data with a small amount is transmitted and received. For these UEs, signaling overhead caused by connection establishment and connection release is much larger than the amount of the data transmitted and received. On the other side, in order to support increasingly real-time application, e.g., virtual reality, access time delay of the mobile communication network in future is greatly reduced. In order to save the signaling overhead, improve data transmission efficiency and reduce delay that the UE accesses the network, some questions about the existing network have to be solved.

SUMMARY

In order to support increasingly real-time application, access time delay of the mobile communication network in future is greatly reduced. In order to save the signaling overhead, improve data transmission efficiency and reduce delay that the UE accesses the network, some questions about the existing network have to be solved.

The present disclosure provides data transmission supporting methods and apparatuses, so as to effectively adapt to service continuity requirements in the further mobile communication network.

In order to implement the intention above, the present disclosure includes technical solutions as follows.

A data transmission supporting method includes: obtaining, by a first node, access information of a user equipment (UE) and/or determining, by the first node, whether a pre-defined condition is satisfied; transmitting, by the first node, data information associated with the UE or data of the UE buffered in the first node to a second radio access network node accessed by the UE according to the access information and/or when determining that the pre-defined condition is satisfied.

Preferably, the pre-defined condition comprises at least one of conditions as follows: UE context is released, the UE context is suspended, a connection of the UE between a radio access network and a core network is released, a connection of the UE between the radio access network and the core network is suspended, the UE is not reached by paging, a UE context releasing command is received, a UE context suspend command is received, and a data forwarding command is received, a UE associated connection between the radio access network and the core network becomes inactive, a UE associated connection between the radio access network and the UE becomes inactive, the UE turns into an inactive state.

Preferably, the data information associated with the UE includes at least one of the following items: data forwarding requirement information associated with the UE and UE context; and/or the first node is the first radio access network node, the paging which does not reach the UE is initiated by the radio access network.

Preferably, the data forwarding requirement information associated with the UE includes at least one of the following items: UE level data forwarding requirement information, UE bearer level data forwarding requirement information, UE session level data forwarding requirement information, UE QoS flow level data forwarding requirement information and/or UE service data flow level data forwarding requirement information, control plane data forwarding requirement information associated with the UE, user plane data forwarding requirement information associated with the UE.

Preferably, the UE bearer level data forwarding requirement information includes information of a UE bearer, and whether the bearer has the data forwarding requirement.

Preferably, the UE session level data forwarding requirement information includes information of a UE session, and whether the session has the data forwarding requirement.

Preferably, the UE QoS flow level data forwarding requirement information includes information of a UE QoS flow, and whether the QoS flow has the data forwarding requirement.

Preferably, the UE service data flow level data forwarding requirement information includes information of a UE service data flow, and whether the service data flow has the data forwarding requirement.

Preferably, the data forwarding requirement information includes at least one of the following items: whether there is buffered data of the UE, a data category of the UE, the information of the UE bearer, the information of the UE session, the information of the UE OoS flow and/or the information of the UE service data flow, data direction of the UE, the number of buffered data packets.

Preferably, the first node is a first radio access network node, wherein the first node transmitting the data information associated with the UE or the data of the UE comprises: directly transmitting, by the first radio access network node, the data information associated with the UE or the data of the UE to the second radio access network node; or transmitting, by the first radio access network node, the data information associated with the UE or the data of the UE to the second radio access network node via the core network; or the first node is a core network node, wherein the first node transmitting the data of the UE to the second radio access network node comprises: retransmitting, by the core network node, the data of the UE buffered in the core network node to the second core network node.

Preferably, the obtaining the access information of the UE includes obtaining the access information of the UE through paging response, light connection, location update, optimization for a user plane of cellular network of things, user connection resume or UE connection establishment.

A data transmission supporting method includes: determining, by a second radio access network node, whether data forwarding address information associated with a user equipment (UE) is needed according to obtained data information associated with the UE; when the data forwarding address information is needed, determining, by the second radio access network node, the data forwarding address information associated with the UE, and transmitting the determined data forwarding address information associated with the UE.

Preferably, the data information associated with the UE includes at least one of the following items: the data forwarding requirement information associated with the UE and UE context.

Preferably, where the data information associated with the UE includes the data forwarding requirement information associated with the UE, the second radio access network node determining whether data forwarding address information associated with the UE is needed according to obtained data information associated with the UE comprises: determining, by the second radio access network node, whether there is buffered data of the UE in the first radio access network node according to the obtained data forwarding requirement information associated with the UE, if yes, determining that the data forwarding address information associated with the UE is needed, else, determining that the data forwarding address information associated with the UE is not needed; the determining the data forwarding requirement information of the UE includes: for the buffered data of the UE, determining the data forwarding address information; and/or when the data information associated with the UE includes the UE context, the second radio access network node determining whether data forwarding address information associated with the UE is needed according to obtained data information associated with the UE comprises: determining, by the second radio access network node, whether there is a UE bearer, a UE session, a UE QoS flow and/or a UE service data flow confirmed to be accepted according to information of the bearer, UE session, UE QoS flow, UE service data flow carried in the UE context, if yes, determining that the data forwarding address information associated with the UE is needed, else, determining that the data forwarding address information of the UE is not needed; the determining the data forwarding address information associated with the UE comprises: determining corresponding data forwarding addresses for all of the UE bearer, the UE session, the UE QoS flow and/or the UE service data flow confirmed to be accepted.

Preferably, when the data forwarding address information associated with the UE is determined according to the data forwarding requirement information associated with the UE and there are buffered UE level data of the UE, buffered UE bearer level data of the UE, buffered UE, session level data of the UE, buffered UE QoS flow level data of the UE and/or buffered UE service data flow level data of the UE, the second radio access network node determines a UE level data forwarding address, a UE bearer level data forwarding address, a UE session level data forwarding address, a UE QoS flow level data forwarding address and/or a UE service data flow level data forwarding address, constructs the data forwarding address information associated with the UE.

Preferably, the second radio access network node transmitting the data forwarding address information includes: transmitting, by the second radio access network node, the data forwarding address information to the first radio access network node through the core network node, or transmitting, by the second radio access network node, the data forwarding address information directly to the first radio access network node; or transmitting, by the second radio access network node, the data forwarding address information to the core network node.

Preferably, when the second radio access network node receives a data forwarding completion indication at the data forwarding address, the second access network node knows that the data forwarding ends or there is no data needed to be forwarded.

A data transmission supporting method includes: receiving, by a core network node, first data forwarding address information associated with a user equipment (UE) and/or data information associated with the UE; transmitting, by the core network node, second data forwarding address information associated with the UE and/or connection establishment control to the first radio access network node according to the received first data forwarding address information associated with the UE and/or the data information associated with the UE.

Preferably, the data information associated with the UE comprises at least one of items as follows: data forwarding requirement information associated with the UE and the UE context.

Preferably, the connection establishment control comprises at least one of items as follows: determining to setup a UE context at the second radio access network node, determining to only setup a UE associated control plane connection between the radio access network node and the core network and determining to initiate a core network level paging.

Preferably, the second data forwarding address information is same with the first data forwarding address information; or the second data forwarding address information includes data forwarding addresses at a core network side one by one corresponding to various data forwarding addresses carried in the first data forwarding address information.

Preferably, when the second data forwarding address information is a data forwarding address at a core network side, after the core network node transmits the second data forwarding address information, the method further includes: receiving the data transmitted from the first core network node at the data forwarding address for the core network side, and forwarding the data to various data forwarding addresses carried in the first data forwarding address information corresponding to each data forwarding address at the core network side.

Preferably, the method further comprises: after data at any data for forwarding address in the second data forwarding address information is completely forwarded, transmitting, by the core network node, an end marker or a data transmission completion notification to a first data forwarding address corresponding to the data completely forwarded; and/or after transmitting the second data forwarding address information or when receiving the first data forwarding address information associated with the UE and/or the data information associated with the UE, the method further comprises: receiving, by the core network node, a message transmitted from the first radio access network node or the second radio access network node and used for requesting release of the UE context in the first radio access network node; indicating, by the core network node, the first radio access network node to release the UE context; and/or after the core network node transmits the second data forwarding address information, or after the core network node receives the data forwarding completion notification transmitted from the first radio access network node, the method further comprises: updating, by the core network node, an address of a UE bearer, a UE session, a UE QoS flow and/or a UE service data flow at a radio access network side to a gateway node of the core network or a user plane function.

A data transmission supporting method includes: obtaining, by a first radio access network node, data forwarding address information associated with a user equipment (UE); and performing, by the first radio access network node, data forwarding control according to the obtained data forwarding address information.

Preferably, the first radio access network node obtains the data forwarding address information from the second radio access network node, the core network node or the UE.

Preferably, the data forwarding address information includes a UE bearer level data forwarding address, a UE session level data forwarding address, a UE OoS flow level data forwarding address, and/or a UE service data flow level data forwarding address, the first radio access network node performing the data forwarding control according to the obtained data forwarding address information includes: when there is a data forwarding requirement, transmitting, by the first radio access network node, buffered data of the UE bearer, buffered data of the UE session, buffered data of the UE QoS flow and/or buffered data of the UE service data flow respectively to a data forwarding address of the corresponding UE bearer, a data forwarding address of the corresponding UE session, a data forwarding address of the corresponding UE QoS flow and/or a data forwarding address of the corresponding UE service data flow; and/or the data forwarding address information includes a control plane data forwarding address, the first radio access network node performing the data forwarding control according to the obtained data forwarding address information includes: transmitting, by the first radio access network node, buffered control plane data of the UE to the control plane data forwarding address.

Preferably, after there is no data forwarding requirement or the data forwarding is completed, the first radio access network node transmits data forwarding completion information to the second radio access network node or the core network node; and/or after there is no data forwarding requirement or the data forwarding is completed, the first radio access network node requires UE context release to the core network node or the second radio access network node; or after there is no data forwarding requirement or the data forwarding is completed, the first radio access network node automatically releases the UE context.

A data transmission supporting apparatus includes a forwarding requirement determining module and a transmitting module; the forwarding requirement determining module, to obtain access information of a user equipment (UE); the transmitting module, to transmit data information associated with the UE or data of the UE buffered in a first radio access network node to a second radio access network node accessed by the UE according to the access information.

A data transmission supporting apparatus includes an address determining module and a transmitting module; the address determining module, to determine whether data forwarding address information associated with a user equipment (UE) is needed according to obtained data information associated with the UE; determine the data forwarding address information associated with the UE when the data forwarding address information is needed; the transmitting module, to transmit the data forwarding address information associated with the UE.

A data transmission supporting apparatus includes a receiving module and a transmitting module; the receiving module, to receive first data forwarding address information associated with a user equipment (UE); the transmitting module, to transmit second data forwarding address information associated with the UE to a first radio access network node according to the received first data forwarding address information.

A data transmission supporting apparatus includes a receiving module and a data forwarding control module; the receiving module, to obtain data forwarding address information associated with a user equipment (UE); the data forwarding control module, to perform data forwarding control according to the obtained data forwarding address information.

It can be seen from the technical solutions above that, by distinguishing data categories and data forwarding requirements, the radio access network node can optimize the data transmission way of the UE, maintain service continuity, support a light connection function, save signaling overhead, and reduce time delay that the UE accesses the network.

According to the embodiments of the present invention, delay of a UE access to a network can be reduced so that enhanced data transmission efficiency can be achieved.

BRIEF DESCRIPTION OF THE DRAWINGS

FIG. 1 is a schematic diagram illustrating architecture supporting a data transmission method according to the present disclosure;

FIG. 2 is a flowchart illustrating a first method for supporting data transmission method according to the present disclosure;

FIG. 3 is a flowchart illustrating a second method for supporting data transmission method according to the present disclosure;

FIG. 4 is a flowchart illustrating a third method for supporting data transmission method according to the present disclosure;

FIG. 5 is a flowchart illustrating a fourth method for supporting data transmission method according to the present disclosure;

FIG. 6 is a schematic diagram illustrating a data transmission method according to a first embodiment of the present disclosure;

FIG. 7 is a schematic diagram illustrating a data transmission method according to a second embodiment of the present disclosure;

FIG. 8 is a schematic diagram illustrating a data transmission method according to a third embodiment of the present disclosure;

FIG. 9 is a schematic diagram illustrating a data transmission method according to a fourth embodiment of the present disclosure;

FIG. 10 is a schematic diagram illustrating a data transmission method according to a fifth embodiment of the present disclosure;

FIG. 11 is a schematic diagram illustrating a data transmission method according to a sixth embodiment of the present disclosure;

FIG. 12 is a first schematic diagram illustrating a basic structure of a data transmission apparatus according the present disclosure;

FIG. 13 is a second schematic diagram illustrating a basic structure of a data transmission apparatus according the present disclosure;

FIG. 14 is a third schematic diagram illustrating a basic structure of a data transmission apparatus according the present disclosure;

FIG. 15 is a fourth schematic diagram illustrating a basic structure of a data transmission apparatus according the present disclosure;

FIG. 16 is a schematic diagram illustrating a data transmission method according to a seventh embodiment of the present disclosure;

FIG. 17 is a schematic diagram illustrating a data transmission method according to an eighth embodiment of the present disclosure;

FIG. 18 is a schematic diagram illustrating initial system architecture of the next generation of network (5G) according to existing technologies.

DETAILED DESCRIPTION

The present invention will be described in further detail hereinafter with reference to accompanying drawings and embodiments to make the objective, technical solution and merits therein clearer.

In order to reduce a paging range and decrease signaling for service establishment, Light Connection as a UE connection way has been introduced at present. The Light Connection includes that the radio access network does not request a core network to release a connection of the UE when the radio access network releases the UE connection, or the UE connection is inactive, e.g., a connection of the UE between the base station and the MME (the control plane of a S1 interface), a connection of the UE between the base station and the Serving Gateway (SGW) (the user plane of the S1 interface), the connection associated with the UE between the base station and an Access and Mobility Management Function (AMF) (NG-C interface control plane), the connection associated with the UE between the base station and a User Plane Function (UPF) (NG-U interface user plane). When the UE is in an idle state, or is inactive, the radio access network still retains the UE context, and the core network (e.g. MME, SGW, AMF, SMF, UPF) deems that the UE is still in a connection state. When there is uplink data, the core network (e.g., SGW, UPF) transmits the data of the UE to the base station, if the UE has been in the idle state, or is inactive (e.g., the connection between the UE and the base station is released, is suspended, or is inactive), the base station may initiate a paging for the UE.

After the Light Connection above as the connection way is introduced, a series of problems to be solved during the data transmission process will be caused, which are analyzed one by one as follows.

Problem 1: after the connection between the UE and an old radio access network node is released, becomes inactive, is changed to the light connection, or suspended, the UE may move to coverage of a new radio access network node, and accesses the new radio access network node. During this process, there is a problem how the new radio access network node obtains data before connection establishment.

In order to solve the problem, when the UE accesses the new radio access network node, the new radio access network node may request the UE context from the old radio network access network node, thus, if the old radio access network node stores the user plane data of the UE and the new radio access network node does not have the UE context, the UE bearer, the UE session, the QoS flow and/or the UE service data flow, the new radio access network node cannot allocate a data forwarding address of the UE bearer, a data forwarding address of the UE session, a data forwarding address of the UE QoS flow and/or a data forwarding address of the UE service data flow, and the old radio access network node still cannot forward the data of the UE to the new access network node;

if the old radio access network node does not store the user plane data of the UE, the new radio access network may not allocate the data forwarding address, but the new radio access network node does not know the fact that the old radio access does not store the data;

f the old access network node may store control plane data of the UE (e.g., NAS signaling), the control plane data may be related with the UE (e.g., UE context updating), or may be related with the session (e.g., a PDU session, a PDU connection), the QoS flow, the service data flow, the bearer (e.g., an EPS bearer modification request in an E-RAB modification request).

Question 2: when there is no interface between the old access network node and the new access network node, the user plane data stored in the old radio access network node may be lost.

Question 3: how the UE performs the UE context release in the old radio access network node. At present, after a inter radio access networks mobility occurs, the core network considers that the new radio access network releases the UE context in the old radio access network node. However, when there is no interface between the new radio access network node and the old radio access network node, the new radio access network node cannot release the old radio access network node.

Question 4: it is unclear how the new radio access network node associates a UE. When the UE accesses the new radio access network node, the UE context is not in the new radio access network node.

In the present disclosure, some terms are described as follows:

In some embodiments, the light connection described below in the present disclosure may be expressed as a paging initiated by the radio access network, an inactive connection or an inactive state (e.g., the inactive state in 5G, an operation under the inactive state).

In some embodiments, a UE movement range is a UE paging range.

In some example, a radio access network node may be a base station an eNB, a NodeB, a central control unit of the radio access network, a distributed unit of the radio access network etc. In the next generation of network, a concept of the node may be virtualized as a function or a unit. The central control unit of the radio access network may be connected with multiple distributed units of the radio access network node.

In some embodiments, a core network node may be a MME, a SGSN, a SGW, CCNF, AMF, SMF, a control node of the control network (e.g., MME, CCNF, AMF), a control plane function of the core network, a user plane function of the core network, a control plane unit of the core network, a user plane unit of the core network, etc. In the next generation of network, a concept of the node may be virtualized as a function or a unit.

In some embodiments, a core network control node may be a MME, a SGSN, AMF, etc.

In some embodiments, a user plane node of a core network may be a SGW, a SGSN, a network slice, UPF, PGW, etc.

FIG. 2 is a flowchart illustrating a first method for supporting data transmission according to the present disclosure. A processing process for the first node in data transmission is described in the procedure. In some embodiments, the first node refers to an old radio access network which stores UE context, but its connection with a UE is disconnected, is a light connection, is inactive, or is suspended, the second radio access network node refers to a radio access network node newly accessed by the UE. In another example, the first node refers to a core network node attached by the UE. As shown in FIG. 2, the procedure includes steps as follows.

At block 201, the first node obtains access information of the UE and/or determines whether the UE satisfies a pre-defined condition.

In some embodiments, the first node receives the access information of the UE from a second radio access network node, the UE or a core network node.

In some embodiments, the first node is the first radio access network node or the core network node. p Optionally, the access information of the UE includes at least one of the following: a UE identity, an identity of the second radio access network node, a PLMN identity, a location identity (e.g., a TA identity TAC, TAI), a cell identity, an access category. In some embodiments, the second radio access network node is the radio access network node accessed by the UE.

Optionally, the UE identity includes at least one of the following: a temporary UE identity (e.g., S-TMSI), a cell radio network temporary identity (e.g., a Cell-Radio Network Temporary Identity (C-RNTI)), a Globally Unique Temporary UE Identity (GUTI), a Resume ID, a Message Authentication Code for Integrity (MAC-I), a Short Message Authentication Code for Integrity (short Mac-I), a temporary identity allocated to the UE by a 5G core network, a temporary identity allocated to the UE by a 5G radio access network.

Optionally, the access category includes at least one of the following: paging response, light connection, location updating, user plane Cellular Internet of Thing (CIOT) optimization, UE connection resume, and UE connection establishment.

In some embodiments, the access information of the UE may be carried in the following message: a retrieve UE context request message, a message among new radio access network nodes (e.g., X2AP, XnAP), a UE context release message.

In another embodiment, the first node confirms that the UE legally accesses the second radio access network node according to the access information of the UE.

Optionally, the pre-defined condition may include at least one of the following: the UE context is released, the UE context is suspended, the connection of the UE between the radio access network and the core network is released, the connection of the UE between the radio access network and the core network is suspended, the UE is not reached by paging, a UE context release command is received, a UE context suspend command is received, and a data forwarding command is received, the connection associated with the UE between the radio access network and the core network becomes inactive, the connection between the radio access network and the UE becomes inactive, the UE enters the inactive state.

Optionally, the condition that the UE is not reached by paging includes transmitting the paging message for the UE, but not receiving a response from the UE. The paging response may be represented through at least one of the following: receiving a connection establishment request initiated by the UE, receiving a connection resume request of the UE, receiving the retrieve UE context request from the second radio access network node, receiving the access information of the UE transmitted from the second radio access network node.

Optionally, the first node is the first radio access network node.

in some embodiments, the first radio access network node obtains the UE context to be released by receiving the UE context release command, e.g., receiving the UE context release command message transmitted from the core network. In another example, when the first radio access network cannot reach the UE by means of paging, the first radio access network node may determine that release or suspend of the UE context is needed. The first radio access network node may proactively initiate the UE context release request or the UE context suspend request to the core network node.

In some embodiments, when receiving the UE context releasing command or the UE context suspend command, the first radio access network node receives the data forwarding command. For example, a UE context release command or a UE context suspend command includes the data forwarding address information associated with the UE (the data forwarding address information associated with the UE is as described in block 301).

At block 202, the first node transmits the data information associated with the UE or the date of the UE buffered in the first node.

Optionally, the first node is the first radio access network node.

In some embodiments, the first radio access network node may directly transmit the data information associated with the UE or the buffered data of the UE to the second radio access network node, or, forwards the data information associated with the UE or the buffered data of the UE to the core network node.

n some example, the first radio access network node may directly transmit the buffered data of the UE, e.g., when the data of the UE buffered in the first radio access network node has only one data packet. The first radio access network node may directly transmit data of the UE through signaling on an interface between radio access network nodes (e.g., X2, Xn) or through signaling on an interface between the radio access network node and the core network node (e.g., S1, Ng). In another example, the first radio access network node transmits the data information associated with the UE, e.g., when the data of the UE buffered in the first radio access network node has multiple data packets. In some particular examples, by transmitting the data information associated with the UE, the first radio access network node may obtain a data forwarding address to continuously transmit the data of the UE.

Optionally, the first node is the core network node.

In some embodiments, the core network node retransmits the buffered data of the UE (e.g., the control plane data not acknowledged yet by the UE). When there is no interface between the first radio access network node and the second radio access network node, the core network node may retransmit to the second radio access network node the data previously transmitted to the first radio access network node.

In some embodiments, when determining that the pre-defined condition is satisfied (as described in block 301), the first radio access network node transmits the data information associated with the UE or the data of the UE buffered in the first radio access network node. The first radio access network may transmit the data information associated with the UE to the control plane node of the core network. The first radio access network node may forward the data of the UE buffered in the first radio access network node to the core network, e.g., forwarding control plane data to the control plane node of the core network, and transmitting user plane data to the user plane node of the core network.

In some embodiments, when the satisfied pre-defined condition includes that the data forwarding command is received, the first radio access network node transmits downlink data to an uplink address configured for the UE bearer, an uplink address configured for the UE session, an uplink address configured for the UE QoS flow and/or an uplink address configured for the UE service data flow.

Optionally, the data of the UE buffered in the first node may include the UE-level data of the UE, UE-bearer-level data of the UE, UE-session-level data of the UE, UE-QoS-flow-level data of the UE and/or UE-service-data-flow-level data of the UE. Optionally, the data of the UE buffered in the first node may include at least one of the following: control plane data of the UE (e.g., NAS signaling), user plane data of the UE.

In some embodiments, the UE-level data of the UE may include the UE-level control plane data of the UE and/or the UE-level user plane data of the UE; the UE-bearer-level data of the UE may include the UE-bearer-level control plane data of the UE and/or the UE-bearer-level user plane data of the UE; the UE-session-level data of the UE may include the UE-session-level control plane data of the UE and/or the UE-session-level user plane data of the UE; the UE-QoS-flow-level data of the UE may include the UE-QoS-flow-level control plane data of the UE and/or the UE-QoS-flow-level user plane data of the UE; the UE-service-data-flow-level data of the UE may include the UE-service-data-flow-level control plane data of the UE and/or the UE-service-data-flow-level user plane data of the UE.

In some embodiments, the user plane date of the UE is the UE-bearer-level user plane data of the UE, the UE-session-level user plane data of the UE, the UE-QoS-flow-level user plane data of the UE, the UE-service-data-steam-level user plane data of the UE and/or the UE-level user plane data of the UE. In another example, the control plane data of the UE may be the UE-level control plane data of the UE, the UE-session-level control plane data of the UE, the UE-QoS-flow-level control plane data of the UE, the UE-service-data-steam-level control plane data of the UE and/or the UE-bearer-level control plane data of the UE. In some embodiments, the control plane data of the UE may be transmitted to the second radio access network node through a UE-level NAS PDU, a UE-session-level NAS PDU, a UE-QoS-flow-level NAS PDU, a UE-service-data-steam-level NAS PDU and/or a UE-bearer-level NAS PDU (e.g., by means of a NAS PDU in a handover request message, the Retrieve UE context response message).

In some embodiments, when directly transmitting the buffered data of the UE, the first radio access network node may distinguish the UE-level data, the UE-session-level data, the UE-QoS-flow-level data, the UE-service-data-steam-level data and/or the UE-bearer-level data to perform transmission, e.g., at least one of the following items is added into a message between radio access network nodes (the handover request message or the Retrieve UE context response message): a UE-level data information element, a UE-session-level data information element, a UE-QoS-flow-level data information element, a UE-service-data-steam-level data information element and/or a UE-bearer-level data information element.

In some embodiments, when directly transmitting the buffered data of the UE, the first radio access network node distinguishes the control plane data of the UE and the data plane data of the UE to perform transmission, e.g., at least one of items as follows is added into a message between the radio access network nodes (the handover request message or the Retrieve UE context response message) the UE-level data information element and/or the UE-bearer-level data information element.

Optionally, the data information associated with the UE may include at least one of the following: the UE context, the data forwarding requirement information associated with the UE.

Optionally, the UE context may include at least one of the following: a UE identity, information of the UE bearer, information of the UE session, information of the UE QoS flow, information of the UE service data flow. Optionally, the information of the UE bearer may include at least one of the following: a bearer identity of the UE (e.g., DRB ID, E-RAB ID). The information of the UE session may include at least one of the following: a UE session identity (e.g., PDU Session ID). The information of the UE QoS flow may include at least one of the following: a UE QoS flow identity (e.g., QFI, QCI, etc.). The information of the UE service data flow may include at least one of the following: a UE service data flow identity (e.g., IP five tuple, TFT, etc.).

Optionally, the data forwarding requirement information associated with the UE may be a UE-level data forwarding requirement information, a UE-bearer-level data forwarding requirement information, a UE-session-level data forwarding requirement information, a UE-QoS flow level data forwarding requirement information, a UE-service-data-flow-level data forwarding requirement information. In some embodiments, the UE-bearer-level data forwarding requirement information may include the information of the UE bearer, and may indicate whether the data forwarding requirement exists for the bearer. In some embodiments, the UE-session-level data forwarding requirement information may include the information of the UE session, and may indicate whether the data forwarding requirement exists for the UE session. In some embodiments, the UE-QoS-flow-level data forwarding requirement information may include the information of the UE QoS flow, and may indicate whether the data forwarding requirement exists for the UE QoS flow. In some embodiments, the UE-service-data-flow-level data forwarding requirement information may include the information of the UE service data flow, and may indicate whether the data forwarding requirement exists for the UE service data flow. Optionally, the data forwarding requirement information of the UE may be a control plane data forwarding requirement information associated with the UE or a user plane data forwarding requirement information associated with the UE.

Optionally, the data forwarding requirement information associated with the UE may include at least one of the following: whether there is the buffered data of the UE, the data category of the UE, the information of the UE bearer, the information of the UE session, the information of the UE QoS flow, the information of the UE service data flow, the data direction of the UE, the number of the buffered data packets.

- whether there is the buffered data of the UE may be represented in whether UE data forwarding is required (e.g., the data forwarding is required when there is the buffered data, and the data forwarding is not required when there is no buffered data).
- the data category of the UE may include at least one of the following: the control plane data of the UE, the user plane data of the UE. In some example, the data category of the may only include the data category of the buffered UE data.
- the data direction of the UE may include at least one of the following: uplink data of the UE, downlink data of the UE. In some example, only the data direction of the buffered data of the UEs is included.
- the information of the UE bearer may be the information of the bearer with the buffered data or information of all bearers of the UE. The information of the UE bearer includes content as described above, which is not repeatedly described herein.
- the number of the buffered data packets may include at least one of the following: one data packet, multiple data packets. In some embodiments, only when there are multiple buffered data packets, the data forwarding requirement information associated with the UE needs to be transmitted.
- the information of the UE session may be the information of the session with the buffered data or information of all sessions of the UE. The information of the UE session includes content as described above, which is not repeatedly described herein.
- the information of the UE QoS flow may be the information of the QoS flow with the buffered data or information of all QoS flows of the UE. The information of the UE QoS flow includes content as described above, which is not repeatedly described herein.
- the information of the UE service data flow may be the information of the service data flow with the buffered data or information of all service data flows of the UE. The information of the UE service data flow includes content as described above, which is not repeatedly described herein.

Optionally, the first node may transmit the data information associated with the UE or the data of the UE buffered in the first node according to one of the following ways:

the first radio access network node transmits the retrieve UE context response message to the second radio access network node;

the first radio access network node transmits the handover request message to the second radio access network node to handover the UE to the second radio access network node, and implements the transmission of the data information associated with the UE or the buffered data of the UE through the handover procedure.

The core network node transmits the initial UE context establishment request message, a path switching response message, or a downlink NAS transmission message to the second radio access network node.

According to the processing above, the first node transmits the data information associated with the UE or the buffered data. In some embodiments, after transmitting the data information associated with the UE, the first radio access network node may receive the data forwarding address information associated with the UE, and performs the data forwarding control according to the data forwarding address information, so as to implement data transfer for the UE in the first radio access network node, avoid data loss, and ensure service continuity. In particular, the procedure of receiving the data forwarding address information and performing the data forwarding control according to the corresponding data forwarding address information will be described in detail in the procedure as shown in FIG. 5, which is not repeatedly described herein.

So far, the method procedure in the method finishes.

FIG. 3 is a flowchart illustrating a second method for supporting data transmission according to the present disclosure. A processing process of the second radio access network node in data transmission is described in the procedure. In some embodiments, a first radio access network node refers to an old radio access network node which stores UE context, but its connection with a UE is disconnected, is a light connection, is inactive, or is suspended; the second radio access network node refers to the radio access network node newly accessed by the UE. As shown in FIG. 3, the procedure includes steps as follows.

At block 301, the second radio access network node determines whether a data forwarding address information associated with the UE is needed, when it is needed, the data forwarding address information associated with the UE is determined, and continues to perform block 302.

According to the obtained data information associated with the UE, it is determined whether the data forwarding address information is needed.

Optionally, when the data information associated with the UE is the data forwarding requirement information associated with the UE, whether there is data buffered at the first radio access network node may be determined according to the data forwarding requirement information associated with the UE, if positive, the second radio access network node determines that the data forwarding address information associated with the UE is needed; otherwise, the second radio access network node determines that the data forwarding address information associated with the UE is not needed, and the procedure ends.

Optionally, when the data information associated with the UE is the UE context, according to the UE bearer information, the UE session information, the UE QoS flow information and/or the UE service data flow information carried in the UE context, it is determined whether there is a UE bearer, a UE session, a UE QoS flow and/or the UE service data flow accepted by the second radio access network node, if positive, the second radio access network node determines that the data forwarding address information associated with the UE is needed; otherwise, the second radio access network node determines that the data forwarding address information associated with the UE is not needed, and the procedure ends. According to the method, after the data forwarding address is confirmed, if the data associated with the UE is received for the UE bearer, the UE session, the UE QoS flow and/or the UE service data flow which previously do not have the data forwarding requirement, the data is still forwarded.

Optionally, the data forwarding address information associated with the UE may include at east one of the following: uplink data forwarding address information, downlink data forwarding address information, information of the UE hearer, information of the UE session, information of the UE QoS flow, information of the UE service data flow. The content of the information of the UE bearer, the information of the UE session, the information of the UE QoS flow, the information of the UE service data flow is as that described in block 202, which is not repeatedly described herein.

Optionally, the data forwarding address information associated with the UE may the UE-level data forwarding address information, the UE-session-level data forwarding address information, the UE-QoS-flow-level data forwarding address information, the UE-service-data-flow-level data forwarding address information and/or the UE-bearer-level data forwarding address information. The UE bearer, the UE session, the UE QoS flow and/or the UE service data flow may be a user plane UE bearer, a user plane UE session, a user plane UE QoS flow, and/or a user plane UE service data flow, e.g., the UE bearer may be a (user) data radio bearer (DRB), or an E-UTRAN Radio Access Bearer (E-RAB); or the UE bearer, the UE session, the UE QoS flow and/or the UE service data flow may be a control plane UE bearer, a control plane UE session, a control plane UE QoS flow and/or a control plane UE service data flow, e.g., the UE bearer may be a signaling radio bearer (SRB) or a E-RAB. The data forwarding address information associated with the UE may further be divided into the control plane data forwarding address information associated with the UE or the user plane data forwarding address information associated with the UE. In some embodiments, when the UE-bearer-level data forwarding address, the UE-session-level data forwarding address, the UE-QoS-flow-level data forwarding address and/or the UE-serviced-data-flow-level data forwarding address are allocated, all bearers of the UE, all sessions of the UE, all QoS flows of the UE and/or all service data flows of the UE are respectively allocated with a corresponding data forwarding address, or only a UE bearer having the buffered data, a UE session having the buffered data, a UE QoS flow having the buffered data and/or a UE service data flow having the buffered data are allocated with corresponding data forwarding addresses, and a UE bearer not having the buffered data is allocated is not allocated with a corresponding data forwarding address.

In some embodiments, when it is determined that the data forwarding address information associated with the UE is needed, the second radio access network node may allocate the data forwarding address for the UE according to the obtained data information associated with the UE. The second radio access network node may obtain the data information associated with the UE from the first radio access network node, the UE or the core network node. Content of the data information associated with the UE is as that described in block 202, which is not described herein.

In some embodiments, the second radio access network node may allocate the data forwarding address for the UE according to the obtained data forwarding requirement information associated with the UE. Optionally, the content of the data forwarding requirement information associated with the UE is as that described in block 202, which is not repeatedly described herein. Optionally, only when there is the buffered data of the UE, the second radio access network node allocates the data forwarding address; when there is no buffered data of the UE, the second radio access network node does not allocate the data forwarding address. In some embodiments, when the buffered data of the UE is the UE-level data, the UE-session data, the UE-QoS-flow data, the UE-service-data-flow data and/or the UE-bearer-level data, the second radio access network node may allocate the corresponding UE-level data forwarding address, corresponding UE-session-level data forwarding address, corresponding UE-QoS-flow-level data forwarding address, corresponding UE-service-data-flow-level data forwarding address and/or the UE-bearer-level data forwarding address.

in another example, the second radio access network node may allocate the data forwarding address for the UE according to the obtained UE context. In some embodiments, regardless whether there is the buffered data of the UE, the second radio access network node allocates possible data forwarding addresses for all bearers of the UE acknowledged to be accepted, all sessions of the UE acknowledged to be accepted, all QoS flows of the UE acknowledged to be accepted, and/or all service data flows of the UE acknowledged to be accepted. Optionally, the second radio access network node may allocate at least one of the following data forwarding addresses: a UE-level data forwarding address, a UE-level control plane data forwarding address, a UE-level user plane data forwarding address, a data forwarding address of an accepted UE bearer, a data forwarding address of an accepted UE session, a data forwarding address of an accepted UE QoS flow and/or a data forwarding address of an accepted UE service data flow, a control plane data forwarding address of an accepted UE bearer, a control plane data forwarding address of an accepted UE session, a control plane data forwarding address of an accepted UE QoS flow and/or a control plane data forwarding address of an accepted UE service data flow, a user plane data forwarding address of an accepted UE bearer, a user plane data forwarding address of an accepted UE session, a user plane data forwarding address of an accepted UE QoS flow and/or a user plane data forwarding address of an accepted UE service data flow.

At block 302, the second radio access network node transmits the data forwarding address information associated with the UE to be used for data forwarding.

Optionally, the second radio access network node transmits the data forwarding address information associated with the UE to the first radio access network node. The second radio access network may forward the data forwarding address information associated with the UE to the first radio access network node through the core network node. In this way, the data forwarding address information received by the first radio access network node is same with the data forwarding address information transmitted by the second radio access network node. The first radio access network node may directly transmit the buffered data to the data forwarding address at the second radio access network node side.

Optionally, the second radio access network node transmits the data forwarding address information associated with the UE to the core network node. Upon reception of the data forwarding address information associated with the UE, the core network node may allocate the corresponding data forwarding address at the core network side, and transmits the data forwarding address at the core network side to the first radio access network node. In this way, the first radio access network node transmits the buffered data to the data forwarding address at the corresponding core network side, and the corresponding core network node forwards the buffered data to the data forwarding address at the second radio access network node side. The node performing the data forwarding at the core network side may be a MME, AMF, SMF, UPF or a SGW. The address information transmitted to the first radio access network node is the address information of the MME side, the AMF side, the SMF side, the UPF side or the SGW side. The core network node may transmit the data forwarding address information associated with the UE through the UE context release command or the UE context suspend command (the data forwarding address information associated with the UE is as described in block 301).

In some embodiments, the second radio access network node may receive the forwarded data or an indication of data forwarding completion (e.g., an end marker packet) from the data forwarding address in the data forwarding address information. When receiving the forwarding completion indication, the second radio access network node may know that the data forwarding ends, or there is no data to be forwarded. According to the way above, the second radio access network node may receive the data before the UE accesses itself, so as to ensure service continuity. It is not hard to understand that according to the way of allocating data forwarding addresses for all IX bearers, all UE sessions, all UE QoS flows and/or all UE service data flows, some UE bearers, some UE sessions, some UE QoS steams and/or some UE service data flows which have no the data forwarding requirement still don't have the data forwarding requirement after reception of the data forwarding addresses. B By means of the data forwarding completion indication as described above, the second RAN node can know that there is no data forwarding requirement for these UE bearers, these UE sessions, these UE QoS steams and/or these UE service data flows.

So far, the method procedure in the method ends.

FIG. 4 is a flowchart illustrating a third method for supporting data transmission. A processing procedure of a core network node in data transmission is described in the procedure. As shown in FIG. 4, the procedure includes steps as follows.

At block 401, the core network node receives first data forwarding address information associated with the UE and/or the data information associated with the UE.

Optionally, the first data forwarding address information associated with the UE is the data forwarding address information associated with the UE transmitted from the second radio access network, as described in block 301.

Optionally, the data information associated with the UE is described as that in block 202, which is not repeatedly described herein.

In some embodiments, the core network node may obtain the data information associated with the UE from at least one of the following: a radio access network node, the UE, a radio access network node retaining UE context, a radio access network node maintaining the connection between the radio access network node and the core network node, a source radio access network node in handover.

In some embodiments, the core network node may obtain the first data forwarding address information associated with the UE from at least one of the following: the user plane node of the core network, the radio access network node, the radio access network node accessed by the UE, the UE, a target radio access network node in handover.

At block 402, the core network node transmits the second data forwarding address information associated with the UE and/or the connection establishment control.

In some embodiments, the core network node transmits second data forwarding address information associated with the UE according to the received first data forwarding address information. Optionally, the core network node transmits the second data forwarding address information associated with the UE to the first radio access network node.

Optionally, the second data forwarding address information associated with the UE may be the received first data forwarding address information associated with the UE, or may be the data forwarding address information associated with the UE at the core network side generated by the core network node one by one according to the received first data forwarding address information (detail content as described in block 202).

In some embodiments, the second data forwarding address information associated with the UE is the data forwarding address information associated with the UE at the second radio access network node side. After receiving second data forwarding address information associated with the UE, the first radio access network node may directly forward the data to the second radio access network node.

in another example, the second data forwarding address information associated with the UE is the data forwarding address information associated with the UE at the core network node side (e.g., the data forwarding address information at the MME side, the AMF side, the UPF side and/or the SGW side). in some embodiments, when receiving the data information associated with the UE which acknowledges that there is the data forwarding requirement, the core network node allocates the data forwarding address of the UE at the core network node side (e.g., the user plane node of the core network allocates the user plane data forwarding address, the control plane node of the core network allocates the control plane data forwarding address). After receiving the data forwarding address information associated with the UE, the first radio access network node may transmit the data to the data forwarding address at the core network side. The core network node may receive the data of the UE transmitted from the first radio access network node, and then transmits the received data to the second radio access network node.

Optionally, the core network node may further perform at least one of the data forwarding control as follows:

updating the address of the UE bearer at the radio access network side, the address of the UE session at the radio access network side, the address of the UE QoS flow at the radio access network side and/or the address of the UE service data flow at the radio access network side to the core network gateway (e.g., SGW, SW, UPF) after transmitting the data forwarding address of the UE to the first radio access network node.

updating the address of the UE bearer at the radio access network side, the address of the UE session at the radio access network side, the address of the UE QoS flow at the radio access network side and/or the address of the UE service data flow at the radio access network side to the core network gateway upon receiving the data forwarding completion notification from the first radio access network node or the second radio access network node. In some embodiments, after transmitting the second data forwarding address information, when receiving the first data forwarding address information associated with the UE and/or the data information associated with the UE, the core network node may receive a request for releasing the UE context in the first radio access network node or related information (e.g., the data forwarding completion notification) from the first radio access network node or the second radio access network node. After receiving the request, the core network node may indicate the first radio access network node to release the UE context.

According to the way above, through the core network node, the data forwarding address information is transmitted to the first radio access network node, so as to ensure that the first radio access network node may transfer the data of the UE, and further to ensure service continuity.

Further, the core network may determine the connection establishment control according to the received data information associated with the UE. The connection establishment control may include at least one of the following:

determining whether to establish the UE context to the second radio access network node or only to establish the control plane connection of the UE between the radio access network node and the core network (e.g., S1-C, NG-C). In some embodiments, when finding out that the UE accesses to the core network node through the second radio access network node, the core network node releases the UE context in the first radio access network node, e.g., the core network node receives the data forwarding address information associated with the UE from the second radio access network node (the data forwarding address information associated with the UE is as described in block 301). 1) when the data information associated with the UE transmitted from the first radio access network node to the core network node confirms that there is the data forwarding requirement, the core network node determines to establish the UE context to the second radio access network node, with regard to that the data needs to be transmitted to the UE through the second radio access network node. 2) when making sure there is no data forwarding requirement of the UE, the core network node determines to only establish to the second radio access network node the control plane connection of the UE between the radio access network node and the core network. The process of establishing the UE context may be implemented by transmitting an initial UE context establishment request message; the process of only establishing the control plane connection of the UE between the radio access network node and the core network may be implemented by transmitting a downlink NAS transfer message.

determining to initiate a core network level paging. In some embodiments, when the first radio access network node cannot reach the UE by means of paging, the first radio access network node triggers a process to the core network in order to releases or suspends UE context, when the data information associated with the UE transmitted from the first radio access network node to the core network node confirms that there is the data forwarding requirement, the core network node may initiate the core network level paging.

So far, the method procedure in the method ends.

FIG. 5 is a flowchart illustrating a fourth method for supporting data transmission according to the present disclosure. A processing procedure of the first radio access network node in the data transmission is described in the procedure. In some embodiments, the first radio access network node refers to an old radio access network node which stores the UE context, and its connection with a UE is disconnected, is a light connection, is inactive, or is suspended; the second radio access network node refers to the radio access network node newly accessed by the UE. As shown in FIG. 5, the procedure includes steps as follows:

At block 501, the first radio access network node obtains the data forwarding address information associated with the UE.

In some embodiments, the first radio access network node obtains the data forwarding address information associated with the UE after transmitting the data information associated with the UE. For example, the data information associated with the UE may be transmitted in a manner as shown in FIG. 2, the data information content of the UE may be as that described in block 202, which is not repeatedly described herein.

Optionally, the first radio access network node may receive the data forwarding address information associated with the UE from at least one of the following: the second radio access network node, the core network node or the UE.

Optionally, the data forwarding address information associated with the UE may be the data forwarding address of the UE at the second radio access network node side or the data forwarding address of the UE at the core network node (e.g., the MME, AMF, UPF and/or the SGW).

In some embodiments, the data forwarding address information associated with the UE at the second radio access network node may be forwarded to the first radio access network node through the core network node (e.g., there is no interface between the first radio access network node and the second radio access network node), after receiving the data forwarding address information associated with the UE, the first radio access network node may directly forward it to the second radio access network node.

in another example, the core network node may transmit the data forwarding address information associated with the UE at the core network side to the first radio access network node. After receiving the data forwarding address information associated with the UE, the first radio access network node may forward the data to the core network node, and the core network node transmits the data to the second radio access network node.

Optionally, the data forwarding address information associated with the UE include information as described in block 301, which is not repeatedly described herein.

In some embodiments, the first radio access network node may obtain the data forwarding address information associated with the UE from the core network node from at least one of the following messages: a UE context releasing message, a new message.

In some embodiments, the first radio access network node may obtain the data forwarding address information associated with the UE from the second radio access network node from at least one of the following messages: a handover request acknowledge message, a new message.

At block 502, the first radio access network node performs the data forwarding control according to the received data forwarding address information.

Optionally, the first radio access network node forwards the buffered data according to the obtained data forwarding address information associated with the UE, i.e., transmitting the buffered data of the UE to the corresponding data forwarding address.

In some embodiments, different buffered data is transmitted corresponding data forwarding addresses. For example, the UE-level data is transmitted to the UE-level data forwarding address, the UE-bearer-level data is transmitted to the UE-bearer-level data forwarding address, the UE-session-level data is transmitted to the UE-session-level data forwarding address, the UE-QoS-flow-level data is transmitted to the UE-QoS-flow-level data forwarding address, the UE-service-data-flow-level data is transmitted to the UE-service-data-flow-level data forwarding address, the control plane data of the UE is transmitted to the control plane data forwarding address of the UE, the user plane data of the UE is transmitted to the user plane data forwarding address of the UE, the uplink data of the UE is transmitted to the uplink data forwarding address of the UE, the downlink data of the UE is transmitted to the downlink data forwarding address of the UE.

Optionally, after the data forwarding is completed or when there is no buffered data, the procedure may further include at least one of the following procedures:

transmitting data forwarding completion information. Optionally, the data forwarding completion information may be UE-level data forwarding completion information, UE-session-level data forwarding completion information, UE-QoS-flow-level data forwarding completion information, UE-service-data-flow-level data forwarding completion information or UE-bearer-level data forwarding completion information. Optionally, the data forwarding completion information may be further divided into control plane data forwarding completion information of the UE and user plane data forwarding completion information of the UE. Optionally, the data forwarding completion information may include at least one of the following: an indication of data forwarding completion, information of the UE bearer for which the data forwarding is completed (included content is as the information of the UE bearer described in block 202), information of the UE session for which the data forwarding is completed (included content is as the information of the session described in block 202), information of the UE QoS flow for which the data forwarding is completed (included content is as the information of the UE QoS flow described in block 202), information of the UE service data flow for which the data forwarding is completed (included content is as the information of the UE service data flow described in block 202), a category of the data for which the data forwarding is completed (included content is as the data category described in block 202), a direction of the data for which the data forwarding is completed (included content is as the data direction described in block 202). In some embodiments, the data forwarding completion information above may be represented as information that there is no data to be forwarded or there is no data buffered, the data category of the data for which the data forwarding is completed may be represented as the data category of the data of which none is forwarded or the data category of the data of which none is buffered. For example, when there is no control plane data to be forwarded or there is no buffered control plane data, the category of the data completely forwarded may be set as the control plane. In some embodiments, the first radio access network node transmits the data forwarding completion information to the core network node or the second radio access network node.

transmitting the indication of data forwarding completion, e.g., an end marker packet, to the data forwarding address for which the corresponding data forwarding is completed, or there is no data to be forwarded.

requesting to release the UE context. In some embodiments, the first radio access network node requests the core network node or the second radio access network node to release the UE context.

automatically releasing the UE context.

So far, the method procedure in the method ends.

The overall flow of the data transmission supporting method according to the present disclosure is described above. Detail implementation of the data transmission supporting method according to the present disclosure is described through some detail embodiments as follows. In order to make description brief, in embodiments below, a way of interaction among multiple network entities is used for description.

FIG. 6 is a schematic diagram illustrating a data transmission supporting method according to a first embodiment of the present disclosure. When a connection of a UE is established, a new radio access network node (i.e., a second radio access network node) obtains UE context from an old radio access network node (i.e., a first radio access network node) through a UE context retrieving process. As shown in FIG. 6, the method includes procedure as follows.

At block 601, the UE releases or suspends a RRC connection with the first radio access network node.

At block 602, the UE establishes or recovers the RRC connection with the second radio access network node, which may be implemented through a RRC connection establishment process, a RRC connection resume process or a RRC connection re-establishment process. The UE may establish the RRC connection when receiving paging for the UE, moving out of a paging range or having data to be transmitted.

At block 603, the second radio access network node transmits a Retrieve UE context request message to the first radio access network node.

At block 604, the first radio access network node transmits a Retrieve UE context response message to the second radio access network node.

Optionally, the message includes the data information associated with the UE (as described in block 202).

In particular, the UE context response message includes the UE context.

At block 605, the second radio access network node allocates the data forwarding address information according to the data information associated with the UE as described in block 301.

Optionally, if there is the data forwarding requirement, the second radio access network node may transmit the data forwarding address information to the first radio access network node. If there is no data forwarding requirement, directly enter block 611.

At block 606, if there is the data forwarding requirement or there is the buffered data, the first radio access network node performs data forwarding according to the data forwarding address allocated by the second radio access network node.

At block 607, the second radio access network node transmits a path switching request message to the core network node.

At block 608, a control node of the core network transmits a bearer modification request message to a user plane node of the core network.

At block 609, the user plane node of the core network transmits a bearer modification response message to the control node of the core network.

At block 610, the user plane node of the core network transmits an end marker packet to the first radio access network node.

After receiving the bearer modification request message, the user plane node of the core network confirms that the data forwarding is completed, and may transmits the end marker packet.

At block 611, the first radio access network node transmits the end marker packet to the second radio access network node. The transmitted end marker packet may be 1) the end marker packet transmitted from the user plane node of the core network; 2) or the end marker generated by the first radio access network node when there is no data to be forwarded in the first radio access network node.

At block 612, the core network node transmits the path switching response message to the second radio access network node.

At block 613, the second radio access network node transmits the UE context release command message to the first radio access network node. The second radio access network node may transmit the UE context release command message after receiving the end marker packet.

At block 614, the first radio access network node releases the UE context, and transmits the UE context release response message to the second radio access network node.

So far, the method procedure in the embodiment ends. Optionally, the first radio access network node may notify to the second radio access network node there is no data forwarding requirement through two ways as follows:
  the first radio access network node indicates in the data information associated with the UE that the data forwarding requirement information associated with the UE is that there is no buffered data of the UE.
  the end marker packet is generated, at block 606, the first radio access network node transmits the end marker packet to the received data forwarding address.

FIG. 7 is a schematic diagram illustrating a data transmission supporting method according to second embodiment of the present disclosure. When a connection of the UE is established, a new radio access network node retrieves UE context from an old radio access network node through a handover retrieving process. As shown in FIG. 7, the method includes procedures as follows.

Blocks 701 and 702 are same as that described in blocks 601 and 602, which is not described repeatedly herein. A UE releases or suspends a RRC connection with a first radio access network node.

At block 703, the second radio access network node transmits an access request message of the UE to the first radio access network node to indicate the access information of the UE (as described in block 201).

At block 704, the first radio access network node transmits a handover request message to a second radio access network. Optionally, the message includes the data information associated with the UE (as described in block 202).

In particular, the handover request message includes the UE context.

At block 705, the second radio access network node may allocate the data forwarding address information according to the data information associated with the UE, which is as described in block 301. The second radio access network node transmits the handover request acknowledge message to the first radio access network node. Optionally, the message includes the data forwarding address information associated with the UE (as described in block 302). If there is no data forwarding requirement, directly enter block 711.

Blocks 706 to 714 are same with blocks 606 to 614, which is not repeatedly described herein.

So far, the method procedure in the embodiment finishes.

FIG. 8 is a schematic diagram illustrating a data transmission supporting method according to a third embodiment of the present disclosure. When a connection of the UE is established, there is no interface between a new radio access network node (a second radio access network node) and an old radio access network node (a first radio access network node). The new radio access network node obtains UE context through a core network node. As shown in FIG. 8, the method includes procedures as follows.

Blocks 801 and 802 are same with blocks 601 and 602, which is not described repeatedly herein. The UE releases or suspends the RRC connection with the first radio access network node.

At block 803, the second radio access network node transmits an initial UE message to the control node of the core network.

At block 804, the control node of the core network transmits an initial UE context establishment request message to the second radio access network node.

At block 805, optionally, the second radio access network node performs RRC connection reconfiguration to the UE.

At block 806, the second radio access network node transmits an initial UE context establishment response message to the control node of the core network. Optionally, the message includes the data forwarding address information associated with the UE (as described in block 302).

At block 807, the control node of the core network transmits the data forwarding address information associated with the UE (as described in block 402) to the first radio access network node.

In some embodiments, the data forwarding address information transmitted from the control node of the core network may be the data forwarding address information at the second radio access network node side, or may be the data forwarding address information at the core network side.

At block 808, the first radio access network node performs the data forwarding according to the received data forwarding address information (the detail operation is same as that described in block 502). When there is no data forwarding requirement, directly perform block 812.

At block 809, the control node of the core network transmits an E-RAB modification request message to the user plane node of the core network.

At block 810, the user plane node of the core network transmits an E-RAB modification response message to the control node of the core network.

At block 811, the user plane node of the core network transmits an end marker packet to the first radio access network node.

At block 812, the first radio access network node transmits the end marker packet to the received data forwarding address.

In particular, the transmitted end marker packet may be 1) the end marker packet received from the user plane node of the core network; 2) or the end marker packet generated by the first radio access network node when there is no data to be forwarded in the first radio access network node.

After the data forwarding is completed, there are two ways to request release of the UE context in the first radio access network node. In a first way, the second radio access network node requests the control node of the core network to release the UE context in the first radio access network node according to the received end marker packet, as described in block 813. In a second way, after there is no data to be forwarded or the data forwarding is completed, the first radio access network node requests the release of the UE context to the control node of the core network, as described in block 814.

At block 813, the second radio access network transmits a data forwarding completion notification to the control node of the core network according to the received end marker packet (as described in block 502), and enter block 815.

At block 814, when there is no data to be forwarded or after the data forwarding is completed, the first radio access network node forwards the data forwarding completion notification or the UE context release request message to the control node of the core network, and enter block 815.

At block 815, the control node of the core network transmits a UE context release command message to the first radio access network node. The control node of the core network may request the first radio access network node to release the UE context according to the received data forwarding completion notification.

At block 816, the first radio access network node transmits a UE context release response message to the control node of the core network.

So far, the method procedure in the embodiment ends.

FIG. 9 is a schematic diagram illustrating a data transmission supporting method according to a fourth embodiment of the present disclosure. When a connection of the UE is established, there is no interface between a new radio access network node (a second radio access network node) and an old radio access network node (a first radio access network node). The new radio access network node retrieves UE context from the old radio access network node through a context retrieving process. As shown in FIG. 9, the method includes procedures as follows.

Blocks 901 and 902 are same with blocks 601 and 602, which are not repeatedly described herein. The UE releases or suspends a RRC connection with the first radio access network node.

At block 903, the second radio access network node transmits a Retrieve UE context request message to the control node of the core network. Optionally, the message includes access information of the UE (as described in block 201).

At block 904, the control node of the core network transmits the Retrieve UE context request message to the first radio access network node. Optionally, the message includes the access information of the UE (as described in block 201).

At block 905, the first radio access network node transmits a Retrieve UE context response message to the control node of the core network. Optionally, the message includes data forwarding information associated with the UE (as described in block 202).

At block 906, the control node of the core network transmits the Retrieve UE context response message to the second radio access network node. Optionally, the message includes the data forwarding information associated with the UE (as described in block 202).

At block 907, optionally, the second radio access network node performs RRC connection reconfiguration for the UE.

At block 908, the second radio access network may configure the data forwarding address information associated with the UE according to the received data information associated with the UE, and the detail operation is as described in block 301. The second radio access network node transmits the data forwarding address information associated with the UE to the control node of the core network (as described in block 302).

Blocks 909 to 918 are consistent with blocks 807 to 816, which are not repeatedly described herein.

So far, the method procedure in the embodiment ends.

FIG. 10 is a schematic diagram illustrating a data transmission supporting method according to a fifth embodiment of the present disclosure. When a connection of the UE is established, there is no interface between a new radio access network node and an old radio access network node. The new radio access network node retrieves UE context from the old radio access network node through the core network through a handover process. As shown in FIG. 10, the method includes procedures as follows.

Blocks 1001 and 1002 are same with blocks 601 and 602, which is not repeatedly described herein. The UE releases or suspends a RRC connection with the first radio access network node.

At block 1003, the second radio access network node transmits an initial UE message to the control node of the core network. Optionally, the message includes the access information of the UE (as described in block 201).

At block 1004, the control node of the core network transmits the access information of the UE to the first radio access network node (as described in block 201).

At block 1005, the first radio access network node transmits a handover request message to the control node of the core network. Optionally, the message includes the data forwarding information associated with the UE (as described in block 202).

At block 1006, the control node of the core network transmits the handover request message to the second radio access network node. Optionally, the message includes the data forwarding information associated with the UE (as described in block 202).

At block 1007, optionally, the second radio access network node performs RRC connection reconfiguration for the UE.

At block 1008, the second radio access network node transmits a handover response message to the control node of the core network.

The data forwarding address information associated with the UE is configured according to the received data information associated with the UE, and the detail operation is as described in block 301. The second radio access network node transmits the data forwarding address information associated with the UE, to the control node of the core network (as described in block 302).

At block 1009, the control node of the core network transmits the handover response message to the first radio access network node. Optionally, the message includes the data forwarding address information associated with the UE.

Blocks 1000 to 1014 are consistent with blocks 808-812, which are not repeatedly described herein.

At block 1015, the second radio access network node transmits a handover complete notification to the control node of the core network.

At block 1016, the control node of the core network transmits a UE context release command message to the first radio access network node. The control node of the core network requests the first radio access network node to release the UE context according to received data forwarding complete notification or the handover complete notification.

At block 1017, the first radio access network transmits the UE context release response message to the control node of the core network.

So far, the method procedure in the embodiment ends.

FIG. 11 is a schematic diagram illustrating a data transmission supporting method according to a sixth embodiment of the present disclosure. After a connection of the UE is established, there are two ways to transmit data of a UE (e.g., control plane data) buffered in an old radio access network node (i.e., a first radio access network node). In a first way, the first radio access network node directly transmits the buffered data to a new access network node (i.e., a new radio access network node), as described in block 1104; in a second way, the control node of the core network retransmits to the second radio access network node the data previously transmitted to the first radio access network node, as described in block 1108. As shown in FIG. 11, the method includes procedures as follows.

At block 1101, a RRC connection between the UE and the first radio access network node is released or suspended.

At block 1102, a RRC connection between the UE and the second radio access network node is established or recovered, which may be implemented through RRC connection establishment, RRC connection resume or RRC connection re-establishment. The UE may establish the RRC connection when receiving paging for the UE, moving out a paging range, or having data to be transmitted.

At block 1103, the second radio access network transmits a Retrieve UE context request message to the first radio access network node.

At block 1104, the first radio access network node transmits a Retrieve UE context response message to the second radio access network node.

Optionally, the message includes data of the UE buffered in the first radio access network node (as described in block 202).

At block 1105, the second radio access network node transmits a path switching request message to a core network node.

At block 1106, a control node of the core network transmits a bearer modification request message to a user plane node the core network.

At block 1107, the user plane node of the core network transmits a bearer modification response message to the control node of the core network.

At block 1108, the core network node transmits a path switching response message to the second radio access network node.

Optionally, the core network node retransmits control plane data for which acknowledge of the UE is not received through the message, or the core network node retransmits the control plane data of the UE through a downlink NAS transfer message (as described in block 202).

So far, the method procedure in the embodiment ends.

FIG. 16 is a schematic diagram illustrating a data transmission supporting method according to a seventh embodiment of the present disclosure. After a UE accesses a second radio access network node, there is no interface between the second radio access network node and a first access network node. The first radio access network node stores UE context and a connection of the UE between the first radio access network node and the core network. After finding that the UE accesses the second radio access network node, the core network requests the first access network node to release a data forwarding process during a UE context release process. As shown in FIG. 16, the method includes procedures as follows.

At block 1601, the UE in a light connection state transmits a RRC connection establishment request message or a RRC connection resume request message to the second radio access network node. Optionally, the message includes access information of the UE. The access information of the UE is as described in block 201, which is not repeatedly described herein.

At block 1602, the second radio access network node finds there is no interface with the first access network node, and transmits at least one of messages as follows: RRC connection establishment reject, RRC connection establishment, RRC connection resume, RRC connection resume reject.

At block 1603, the UE establishes RRC connection with a new radio access network.

At block 1604, the second radio access network transmits an Initial UE message to a control node of the core network.

At block 1605, the control node of the core network finds that the UE accesses the second access network node. The control node of the core network may immediately release the connection of the UE between the first radio access network node and the user plane node of the core network. Thus, the data cannot be continually transmitted to the first radio access network node anymore.

At block 1606, the control node of the core network transmits a UE context release command to the first radio access network node. Optionally, the message carries data forwarding addresses or data forwarding indications of various UE bearers, various UE sessions, various UE QoS flows and/or various UE service data flows. Optionally, a data forwarding indication indicates the first radio access network node to forward the data to the core network. For example, the user plane data is forwarded to the user plane node of the core network, the control plane data is forwarded to the control node of the core network. Optionally, the data forwarding addresses of various UE bearers, the data forwarding addresses of various UE sessions, the data forwarding addresses of various UE QoS flows and/or the data forwarding addresses of various UE service data flows indicate the first radio access network node to forward the data to the indicated forwarding addresses.

At block 1607, the first radio access network node transmits UE context release complete to the core network node.

At block 1608, the core network node determines whether transmit an initial context establishment request or a downlink NAS transfer message to the second radio access network node according to requirements.

So far, the method procedure in the embodiment ends. Some irrelevant blocks are omitted.

FIG. 17 is a schematic diagram illustrating a data transmission supporting method according to an eighth embodiment of the present disclosure. A first radio access network node stores UE context and a connection between the first radio access network node and a core network. When receiving data of a UE, initiating paging for the UE, but not receiving UE's response, the first radio access network requests the core network to release a data forwarding process in a UE context release process. As shown in FIG. 17, the method includes procedures as follows.

At block 1701, the first wireless access network node receives the data of the UE, and initiates the paging for the UE.

At block 1702, the first radio access network may request the second radio access network node to paging the UE.

At block 1703, the first radio access network node requests the core network to release the UE context or delete a UE context message, e.g., initiating RRC connection establishment between the UE and a new radio access network when not receiving the paging of the UE.

Optionally, the message includes the data forwarding requirement information associated with the UE. Optionally, the data forwarding requirement information associated with the UE is as described in block 202, which is not repeatedly described.

At block 1704, the control node of the core network transmits the UE context release command to the first radio access network node. Optionally, the message carries data forwarding addresses or data forwarding commands of various UE bearers, data forwarding addresses or data forwarding commands of various UE sessions, data forwarding addresses or data forwarding commands of various UE QoS flows and/or data forwarding addresses or data forwarding commands of various UE service data flows. Optionally, a data forwarding indication indicates the first radio access network node to forward the data to the core network. For example, user plane data is forwarded to a user plane node of the core network, control plane data is forwarded to a control node of the core network. Optionally, the data forwarding addresses of the various UE bearers, the data forwarding address of the various UE sessions, the data forwarding addresses of the various UE QoS flows and/or the data forwarding addresses of the various UE service data flows indicate the first radio access network node to forward the data to designated forwarding addresses.

At block 1705, the first radio access network node transmits a UE context release complete to the core network node.

At block 1706, when receiving the data forwarding requirement information associated with the UE, the core network node may initiate the paging of the UE.

So far, the method procedure in the embodiment ends. Some irrelevant blocks are omitted.

The detail implementation of data transmission supporting methods according to the present disclosure is described above. Corresponding to the data transmission supporting methods above, the present disclosure further provides data transmission supporting apparatuses.

Corresponding to the method as shown in FIG. 2, the present disclosure provides a data transmission supporting apparatus. FIG. 12 illustrates a basic structure of the apparatus, and the apparatus may be located in a first radio access network node or a core network node. As shown in FIG. 12, the apparatus includes a forwarding requirement determining module and a transmitting module.

The forwarding requirement determining module is configured to obtain access information of a UE. The transmitting module is configured to transmit data information associated with the UE or data of the UE buffered in a first radio access network node to a second radio access network node accessed by the UE according to the access information. Preferably, the apparatus may further include a data forwarding control module, configured to perform data forwarding control according to a data forwarding address carried in the message after receiving data forwarding address information.

Corresponding to the method as shown in FIG. 3, the present disclosure provides a data transmission supporting apparatus. FIG. 13 illustrates a basic structure of the apparatus, and the apparatus may be located in a second radio access network node. As shown in FIG. 13, the apparatus includes an address determining module and a transmitting module.

The address determining module is configured to determine whether data forwarding address information associated with a UE is needed according to obtained data information associated with the UE; to determine the data forwarding address information associated with the UE when the data forwarding address information is needed. The transmitting module is configured to transmit the determined data forwarding address information associated with the UE.

Corresponding to the method as shown in FIG. 4, the present disclosure provides a data transmission supporting apparatus. FIG. 14 illustrates a basic structure of the apparatus, and the apparatus may be located in a core network node. As shown in FIG. 14, the apparatus includes a receiving module and a transmitting module.

The receiving module is configured to receive first data forwarding address information associated with a UE. The transmitting module is configured to transmit second data forwarding address information associated with the UE to a first radio access network node according to the received first data forwarding address information. The first data forwarding address information includes a data forwarding address allocated for the UE or a UE bearer, a UE session, a UE QoS flow and/or a UE service data flow by the second radio access network node, Corresponding to the method as shown in FIG. 5, the present disclosure provides a data transmission supporting apparatus. FIG. 15 illustrates a basic structure of the apparatus, and the apparatus may be located in a first radio access network node. As shown in FIG. 15, the apparatus includes a receiving module and a data forwarding control module.

The receiving module is configured to obtain data forwarding address information associated with a UE. The data forwarding control module is configured to perform data forwarding control according to the obtained data forwarding address information.

It can be seen from the technical solutions above that, by distinguishing data categories and data forwarding requirements, the radio access network node can optimize the data transmission way of the UE, maintain service continuity, support a light connection function, save signaling overhead, and reduce time delay that the UE accesses the network.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A method performed by a first base station in a wireless communication system, the method comprising:
   obtaining access information of a user equipment (UE) based on a retrieve UE context request message;
   determining whether a pre-defined condition is satisfied, the pre-defined condition comprising releasing a radio resource control (RRC) connection with the UE for the UE to enter an RRC inactive state and receiving a data forwarding command message;
   transmitting, to a second base station, a retrieve UE context response message including data information associated with the UE based on the access information, in case that the pre-defined condition is satisfied; and
   transmitting, to the second base station, data of the UE buffered in the first base station based on the data forwarding command message,
   wherein the first base station stores a UE context of the UE,
   wherein the access information includes an identity of the second base station, and
   wherein the data information includes the UE context.

2. The method of claim 1, wherein the transmitting the data of the UE comprises:
   receiving data forwarding address information associated with the UE; and
   transmitting, to the second base station, the data of the UE based on the data forwarding address information.

3. A method performed by a second base station in a wireless communication system, the method comprising:
   transmitting, to a first base station, a retrieve UE context request message including access information of a user equipment (UE);
   receiving, from the first base station, a retrieve UE context response message including data information associated with the UE based on the access information, in case that a pre-defined condition is satisfied; and
   receiving, from the first base station, data of the UE buffered in the first base station,
   wherein the first base station stores a UE context of the UE,
   wherein the access information includes an identity of the second base station,
   wherein the data information includes the UE context, and
   wherein the pre-defined condition comprises the UE entering an RRC inactive state to the first base station and the first base station receiving a data forwarding command message.

4. The method of claim 3, wherein the receiving the data of the UE comprises:
   transmitting data forwarding address information associated with the UE; and
   receiving, from the first base station, the data of the UE based on the data forwarding address information.

5. A first base station in a wireless communication system, the first base station comprising:
   a transceiver configured to transmit and receive a signal; and
   a controller coupled with the transceiver and configured to:
   obtain access information of a user equipment (UE) based on a retrieve UE context request message,
   determine whether a pre-defined condition is satisfied, the pre-defined condition comprising releasing a radio resource control (RRC) connection with the UE for the UE to enter an RRC inactive state and receiving a data forwarding command message,
   transmit, to a second base station, a retrieve UE context response message including data information associated with the UE based on the access information, in case that the pre-defined condition is satisfied, and
   transmit, to the second base station, data of the UE buffered in the first base station based on the data forwarding command message,
   wherein the first base station stores a UE context of the UE,
   wherein the access information includes an identity of the second base station, and
   wherein the data information includes the UE context.

6. The first base station of claim 5, wherein the controller is configured to:
   receive data forwarding address information associated with the UE, and
   transmit, to the second base station, the data of the UE based on the data forwarding address information.

7. A second base station in a wireless communication system, the second base station comprising:
   a transceiver configured to transmit and receive a signal; and
   a controller coupled with the transceiver and configured to:
   transmit, to a first base station, a retrieve UE context request message including access information of a user equipment (UE),
   receive, from the first base station, a retrieve UE context response message including data information associated with the UE based on the access information, in case that a pre-defined condition is satisfied, and
   receive, from the first base station, data of the UE buffered in the first base station,
   wherein the first base station stores a UE context of the UE,
   wherein the access information includes an identity of the second base station,
   wherein the data information includes the UE context, and
   wherein the pre-defined condition comprises the UE entering an RRC inactive state to the first base station and the first base station receiving a data forwarding command message.

8. The second base station of claim 7, wherein the controller is configured to:
   transmit data forwarding address information associated with the UE, and
   receive, from the first base station, the data of the UE based on the data forwarding address information.

* * * * *